US010980029B2

(12) United States Patent
McCullough et al.

(10) Patent No.: US 10,980,029 B2
(45) Date of Patent: Apr. 13, 2021

(54) METHODS AND APPARATUS FOR SUPPORTING MULTIPLE-INPUT AND MULTIPLE-OUTPUT (MIMO) ADVERTISEMENTS

(71) Applicant: Charter Communications Operating, LLC, St. Louis, MO (US)

(72) Inventors: Taren G. McCullough, Denver, CO (US); Matthew Dillon, Greenwood Village, CO (US); Christopher W. Watson, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/413,538

(22) Filed: May 15, 2019

(65) Prior Publication Data
US 2020/0367222 A1    Nov. 19, 2020

(51) Int. Cl.
| H04W 72/04 | (2009.01) |
| H04B 7/0452 | (2017.01) |
| H04B 7/0408 | (2017.01) |
| H04W 74/08 | (2009.01) |

(52) U.S. Cl.
CPC ........ *H04W 72/046* (2013.01); *H04B 7/0408* (2013.01); *H04B 7/0452* (2013.01); *H04W 74/0808* (2013.01)

(58) Field of Classification Search
CPC ... H04W 84/12; H04W 74/006; H04W 72/04; H04W 74/00; H04W 72/0453; H04W 72/0413; H04W 24/10; H04W 28/18; H04W 88/08; H04W 72/085; H04W 72/1205; H04W 24/02
See application file for complete search history.

(56) References Cited

U.S. PATENT DOCUMENTS

| 2012/0328034 A1* | 12/2012 | Nabar .................. H04B 7/0634 375/260 |
| 2016/0007325 A1* | 1/2016 | Seok ...................... H04L 5/0007 370/329 |
| 2016/0036637 A1* | 2/2016 | Malik .................. H04L 41/0816 370/329 |
| 2018/0302847 A1* | 10/2018 | Chu .................. H04W 72/0453 |
| 2018/0359768 A1* | 12/2018 | Huang .................. H04L 1/0015 |
| 2019/0124719 A1* | 4/2019 | Park ...................... H04B 7/0697 |

* cited by examiner

*Primary Examiner* — Luat Phung
*Assistant Examiner* — Najeeb Ansari
(74) *Attorney, Agent, or Firm* — Straub & Straub; Michael P. Straub; Stephen T. Straub

(57) ABSTRACT

A station (STA), which supports multiple spatial streams, can, and sometimes does, re-advertise the station as supporting less spatial stream (SS) than the actual number of spatial streams that the device does actually support. In some embodiments, a station's maximum advertised maximum number of spatial streams is proactively reduced based on the station's throughput being below one or more thresholds. In some embodiments, the analysis and level of spatial stream value to be reported in a re-advertisement is determined by the access point. In some other embodiments, the analysis and level of spatial stream value to be reported in a re-advertisement is determined by the station. The access point allocating its limited supported spatial streams among stations is able to more efficiently allocate the air link resources.

20 Claims, 22 Drawing Sheets

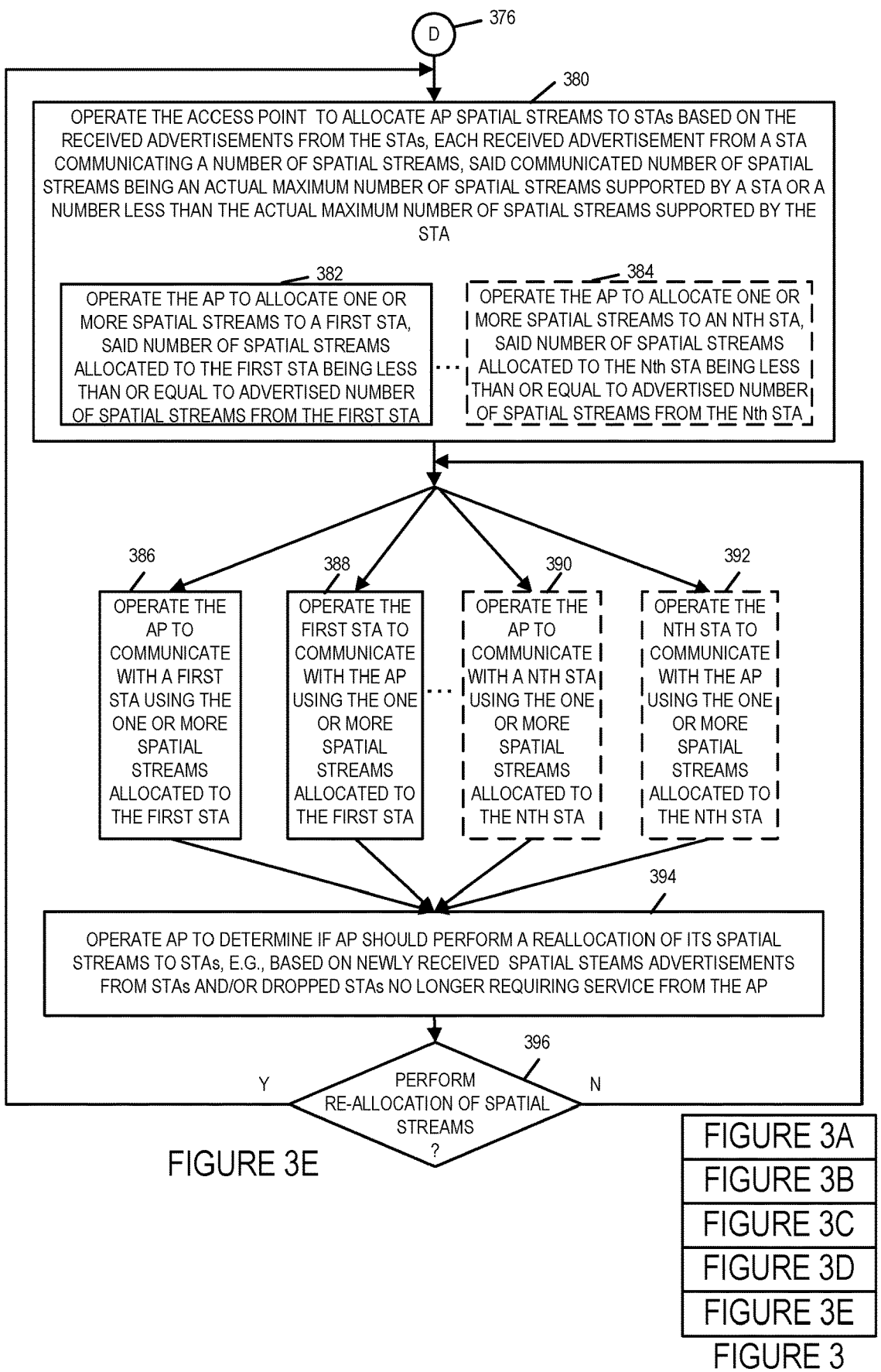

FIGURE 7A | FIGURE 7B | FIGURE 7C

METHODS AND APPARATUS FOR SUPPORTING MULTIPLE-INPUT AND MULTIPLE-OUTPUT (MIMO) ADVERTISEMENTS

FIELD

The present application relates to communications methods and apparatus, and more particularly, to methods and apparatus for dynamical advertising information relating to multiple-input and multiple-output (MIMO) capabilities.

BACKGROUND

Stations (STAs) advertise their radio capabilities to the access point (AP) in order to properly place the STA into grouping used for multiple user multiple-input and multiple-output (MU-MIMO) transmissions. The AP will initially place the STA into grouping based upon the maximum number of spatial streams the STA advertises it supports. Some APs will reactively reduce the number of spatial streams it uses to communicate with some STAs based on poor environmental conditions.

Current systems take interference reduction (i.e. complex zero forcing) into account when optimizing the ecosystem. This function can be affected by a large sum of environmental influences that result in an improper stream selection. Since current systems are reactive, the optimizations mostly occur after the device experiences poor network quality. Optimization can have a long training period and adaptation timeframe for feedback systems. That time is spent retransmitting frames and taking up airtime that could be better utilized by other transmissions.

Based on the above discussion there is a need for new methods and apparatus related to optimizing MIMO systems.

SUMMARY

A station (STA), which supports multiple spatial streams, can, and sometimes does, re-advertise the station as supporting less spatial stream (SS) than the actual number of spatial streams that the device does actually support. In some embodiments, a station's maximum advertised maximum number of spatial streams is proactively reduced based on the station's throughput being below one or more thresholds. In some embodiments, the analysis and level of spatial stream value to be reported in a re-advertisement is determined by the access point. In some other embodiments, the analysis and level of spatial stream value to be reported in a re-advertisement is determined by the station. The access point allocating its limited supported spatial streams among stations is able to more efficiently allocate the air link resources.

By proactively reducing the number of spatial streams a STA advertises, the access point (AP) has an easier time correcting improper stream selection and/or the system is able to respond quicker to changing conditions, providing for more efficient utilization of the limited air link resources.

An exemplary communications method, in accordance with some embodiments, comprises: receiving, at an access point (AP), a first (e.g., initial) advertisement from a first station indicating a first maximum number of spatial streams supported by the first station; receiving, at the access point, a re-advertisement from the first station, said re-advertisement indicating a second maximum number of spatial streams supported by the first station, said second maximum number of spatial streams being lower than said first maximum number of spatial streams; and operating the access point to allocate AP spatial streams to stations based on advertisements of the maximum number of spatial streams supported by the individual stations transmitting advertisements to the access point.

A exemplary communications system, in accordance with some embodiments, includes an access point supporting multiple spatial streams, the access point including: a wireless receiver; and a first processor, said first processor configured to operate the access point to: receive a first (e.g., initial) advertisement from a first station indicating a first maximum number of spatial streams supported by the first station; receive a re-advertisement from the first station, said re-advertisement indicating a second maximum number of spatial streams supported by the first station, said second maximum number of spatial streams being lower than said first maximum number of spatial streams; and allocate AP spatial streams to stations based on advertisements of the maximum number of spatial streams supported by the individual stations transmitting advertisements to the access point.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 3E is a fifth part of a flowchart of an exemplary method of operating a communications system in accordance with an exemplary embodiment.

FIG. 3 comprises the combination of FIG. 3A, FIG. 3B, FIG. 3C, FIG. 3D and FIG. 3E.

DETAILED DESCRIPTION

Figure 1:
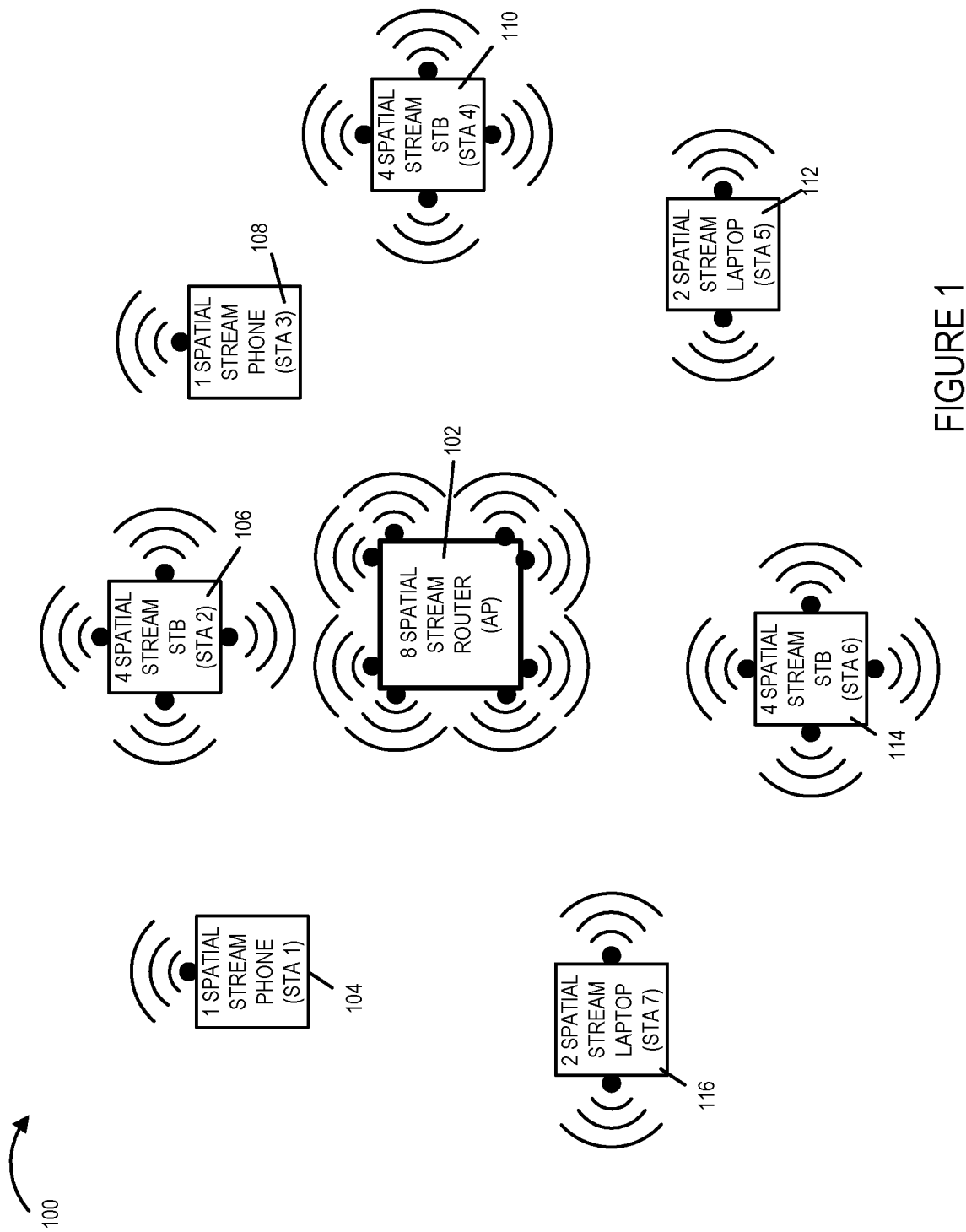
FIG. 1 is a drawing of an exemplary wireless communications system in an exemplary embodiment.

FIG. 1 is a drawing of an exemplary wireless communications system 100 in an exemplary embodiment. Exemplary wireless communications system 100 includes an access point 102, which is an 8 spatial stream (SS) router, a first station (STA 1) 104, which is a 1 spatial stream phone, a second station (STA 2) 106, which is a 4 spatial stream set top box (STB), a third station (STA 3) 108, which is a 1 spatial stream phone, a fourth station (STA 4) 110, which is a 4 spatial stream set top box (STB), a fifth station (STA 5) 112, which is a 2 spatial stream laptop computer, a sixth station (STA 6) 114, which is a 4 spatial stream STB, and a seventh station (STA 7), which is a 2 spatial stream laptop computer 116. In some embodiments the exemplary system further includes one or more stations which are wireless extenders, each wireless extender having multiple spatial stream capability with regard to communicating with access point 102.

Each of the stations (104, 106, 108, 110, 112, 114, 116) initially advertises a spatial stream count number for the station which is the maximum number of spatial streams supported by the station. Stations which support 2 or more spatial streams may, and sometimes do advertise a spatial stream count number for the station which is less than the maximum number of spatial streams supported by the station, e.g. as part of a re-advertisement. In some embodiments, the router, e.g., AP, performs an evaluation, determines a number of spatial streams to be reported by a station in a re-advertisement, and sends a command to the station commanding the station to advertise a particular number of spatial streams; and the station receives the command and advertises the commanded number of spatial streams in a re-advertisement. In some other embodiments, a station performs an evaluation, determines a number of spatial streams to be reported by the station in a re-advertisement, and sends advertises the determined number of spatial streams. The router, e.g. AP, receives one or more re-advertisements from stations, and allocates to access point spatial streams to stations based on the received advertisements.

In some embodiments, an evaluation is triggered by the determined clear channel assessment channel utilization determination of the access point exceeding a first predetermined value, e.g., 75%. In some embodiments, an evaluation is triggered by: i) the determined clear channel assessment channel utilization determination of the access point exceeding a first predetermined value, e.g., 75%, and ii) the determined total station spatial stream count being greater than the spatial stream maximum for the access point.

FIG. 2, comprising the combination of FIG. 2A, FIG. 2B, FIG. 2C, FIG. 2D and FIG. 2E, is a flowchart 200 of an exemplary method of operating a communications system, e.g., communications system 100 of FIG. 1, in accordance with an exemplary embodiment.

Operation of the exemplary method starts in step 202 in which the communications system is powered on and initialized. Operation proceeds from start step 202 to step 204, 210, 216, and via connecting node D 280 to step 282.

In step 204, an access point, e.g., access point 102 of FIG. 1, is operated to monitor to detect new station to be serviced by the access point. Step 204 may, and sometimes does, include step 206, in which the access point receives an initial advertisement from a station, e.g., one of STA 1 104, STA 2 106, STA 3 108, STA 4 110, STA 5 112, STA 6 114, or STA 7 116, communicating a spatial stream count number of the station, which is the actual maximum number of spatial steams supported by the station, e.g., communicating (1, 4, 1, 4, 2, 4, or 2) respectively. For example, in step 206 the access point receives a first (e.g., initial) advertisement from a first station, e.g., STA 2 106, indicating a first maximum number of spatial streams, e.g., 4 streams, supported by the first station, which is the actual number of the streams supported by the first station. In response to the reception of step 206, operation proceeds from step 206, to step 208, in which the AP stores the actual maximum number of spatial streams supported by the station with information identifying the station. Step 204 is performed on an ongoing basis.

In step 210, the access point is operated to collect throughput metrics for a first predetermined time interval, e.g., 15 minutes. Operation proceeds from step 210 to step 212. In step 212 the access point is operated to store the throughput metrics in an access point based analytics database 214. Operation processed from step 212 to step 210, in which the AP collects throughput metrics for another iteration of the first predetermined time interval, and then in step 212 the AP stores the collected throughput metrics in database 214. Steps 210 and 212 are repeated on an ongoing basis.

In step 216 the access point performs a clear channel assessment (CCA). Step 216 includes steps 218 and 220. In step 218 the access point determines a CCA channel utilization percentage. Operation proceeds from step 218 to step 220. In step 220 the access point determines a total station (STA) spatial stream count. Step 220 includes step 222 in which the access point sums the most recently advertised spatial stream count numbers from the stations (STAs) being serviced by the access point to determine a total STA spatial stream count. Operation proceeds from step 216 to step 224.

In step 224, if the determined CCA channel utilization is greater than a first predetermined value, e.g., 75%, then operation proceeds from step 224, to step 227. However, if the determined CCA channel utilization is not greater than the first predetermined value, e.g., 75%, then operation proceeds from step 224, to step 226. In step 226 the access point waits a second predetermine amount of time, e.g., 15 minutes. Then, operation proceeds from step 226 to step 216, in which the access point performs another CCA.

Returning to step 227, in step 227 the access point determines if any action should be taken to reduce the number of spatial streams advertised by one or more stations. Step 227 includes step 288. In step 228 if the determined total STA spatial stream count is greater than the AP spatial stream maximum, e.g., 8 for AP 102 of FIG. 1, then operation proceeds from step 228, via connecting node A 230 to step 232. However, if the determined total STA spatial stream count is not greater than the AP spatial stream maximum, then operation proceeds from step 228 to step 226.

Returning to step 232, in step 232 the access point identifies STAs that are eligible for spatial stream evaluation. In some embodiments, STAs which support more than one spatial stream are eligible for spatial steam evaluation, and STAs which only support one spatial stream are not eligible for spatial stream evaluation. In some embodiments, the STAs identified as being eligible for spatial stream evaluation are STAs which support more than one spatial stream and satisfy one or more additional criteria. In some embodiments, the one or more additional criteria includes having a level of service which corresponds to a particular subset of available levels of service. Operation proceeds from step 232 to step 234.

In step 234 the access point retrieves, e.g., from analytics database 214, the throughput metrics for the identified STAs which are eligible for spatial stream evaluation. Operation proceeds from step 234 to step 236, in which the access point evaluates the retrieved throughput metrics for the identified STAs. Step 236 includes step 238, in which the access point determines an average throughput for each of the identified STAs. Operation proceeds from step 236, via connecting node B 240, to step 242. The flowchart procedure of FIG. 2C and FIG. 2D are performed for each of the identified STAs, e.g., the flowchart procedure of FIG. 2C and FIG. 2D is performed 3 times if 3 STAs were identified in step 232.

Figure 2A:
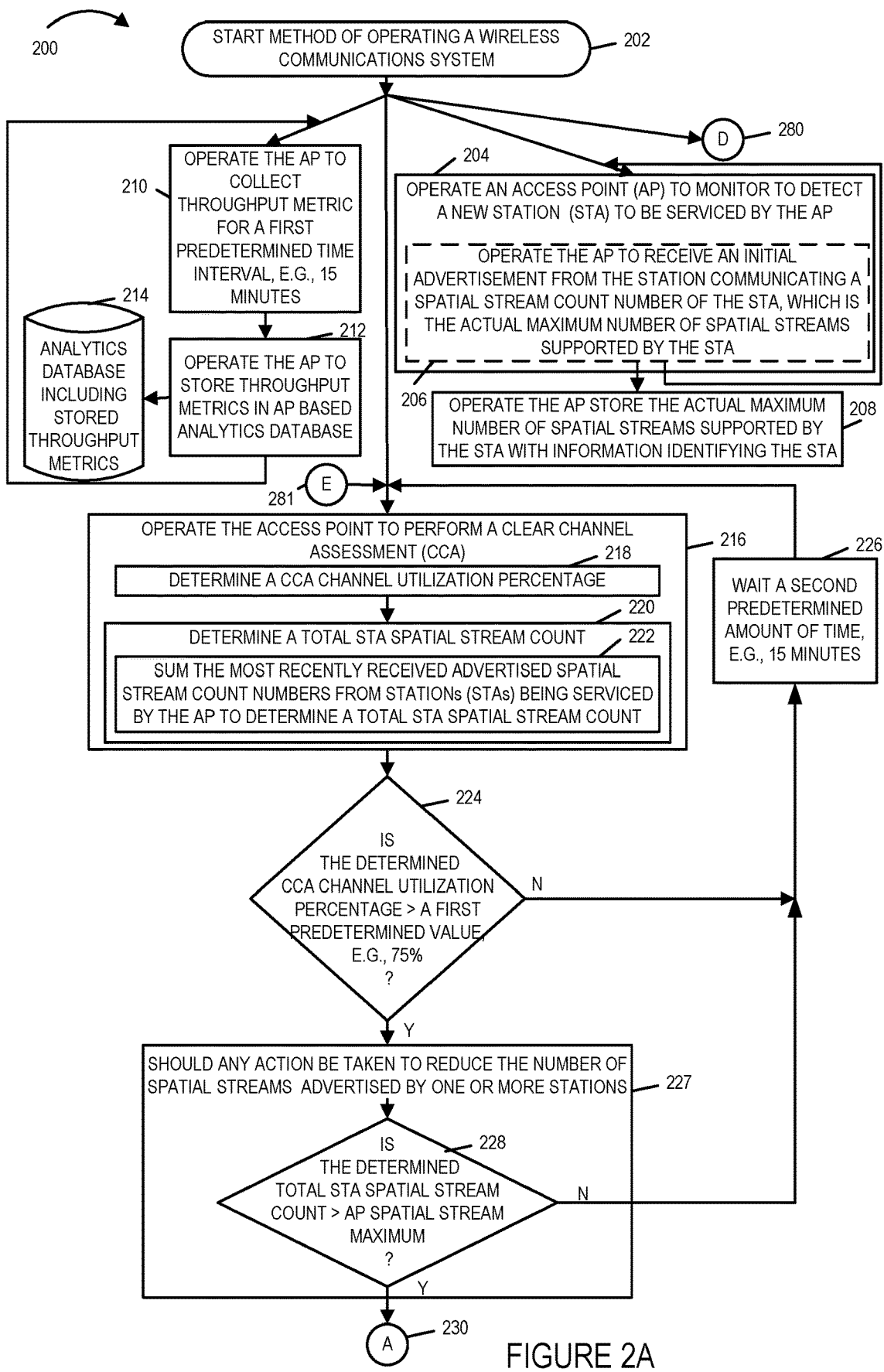
FIG. 2A is a first part of a flowchart of an exemplary method of operating a communications system in accordance with an exemplary embodiment.
Figure 2B:
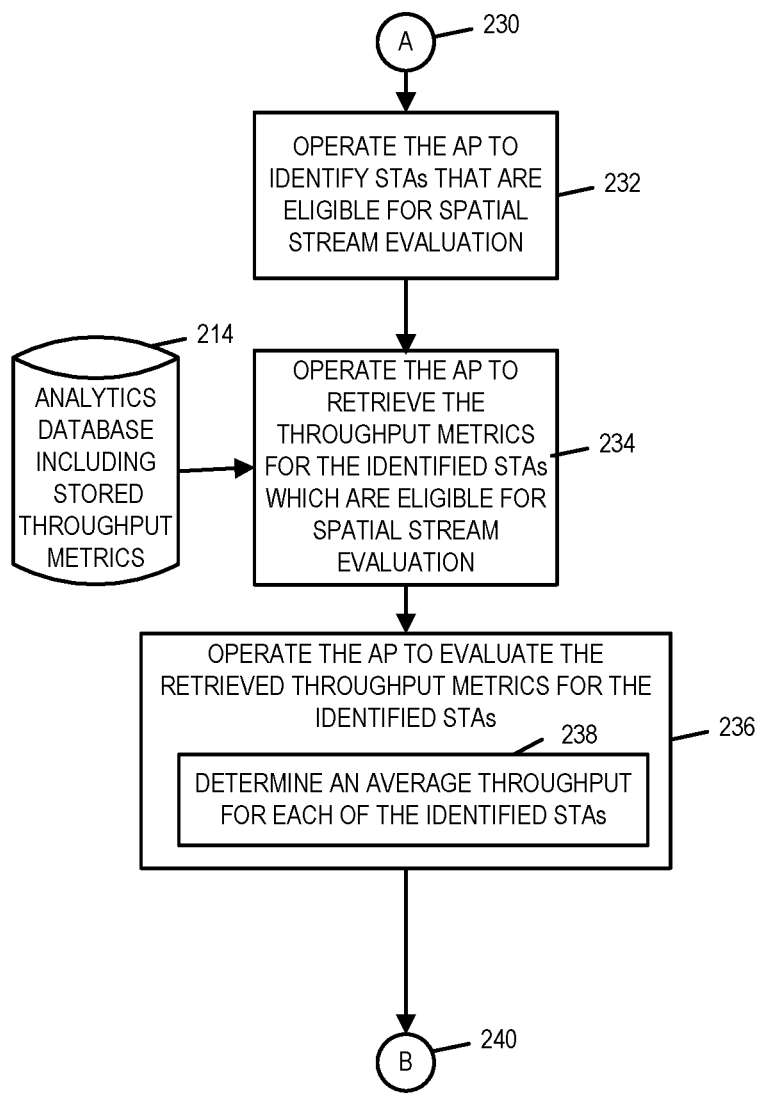
FIG. 2B is a second part of a flowchart of an exemplary method of operating a communications system in accordance with an exemplary embodiment.
Figure 2C:
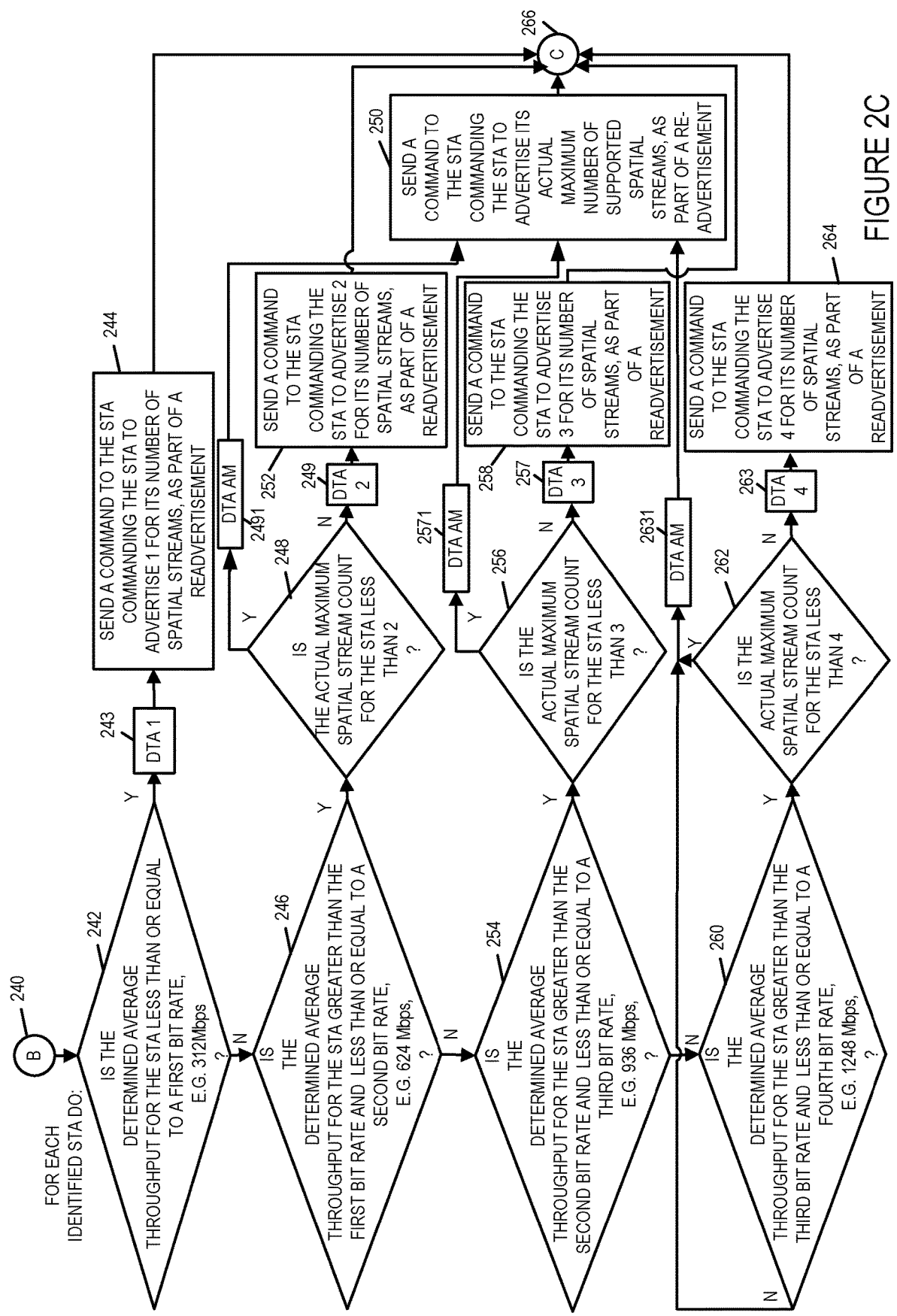
FIG. 2C is a third part of a flowchart of an exemplary method of operating a communications system in accordance with an exemplary embodiment.
Figure 2D:
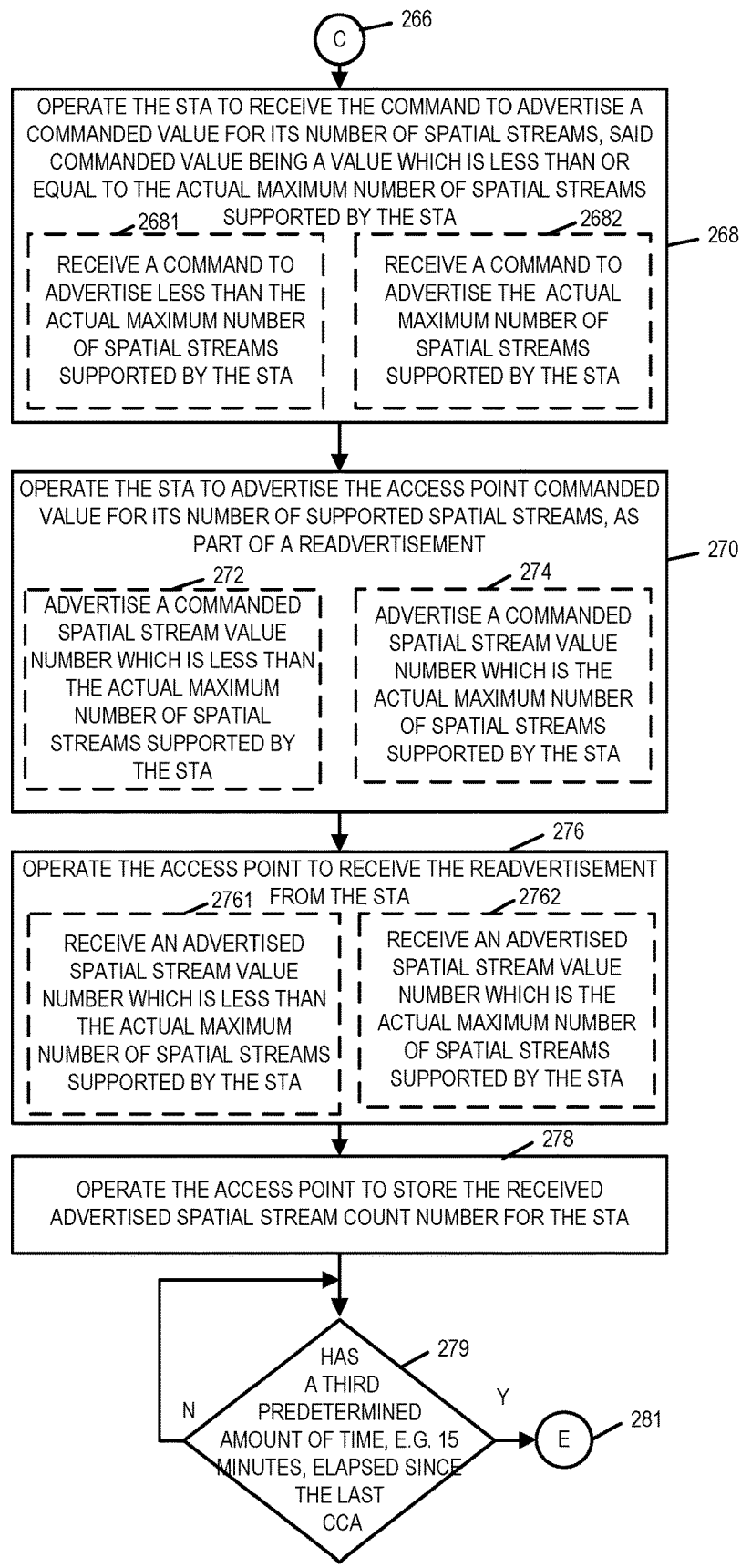
FIG. 2D is a fourth part of a flowchart of an exemplary method of operating a communications system in accordance with an exemplary embodiment.
Figure 2E:
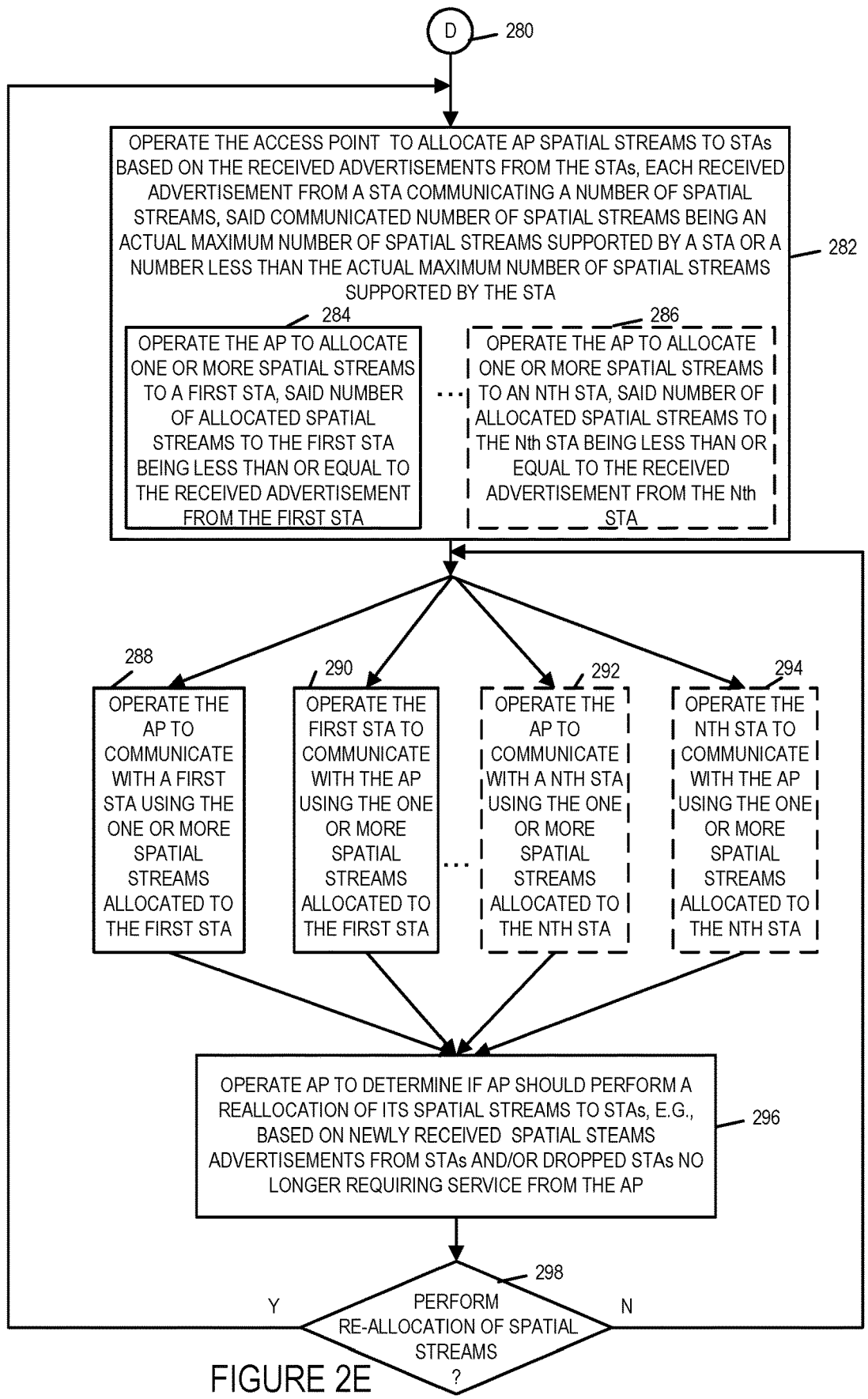
FIG. 2E is a fifth part of a flowchart of an exemplary method of operating a communications system in accordance with an exemplary embodiment FIG. 2 comprises the combination of FIG. 2A, FIG. 2B, FIG. 2C, FIG. 2D and FIG. 2E.
Figure 8:
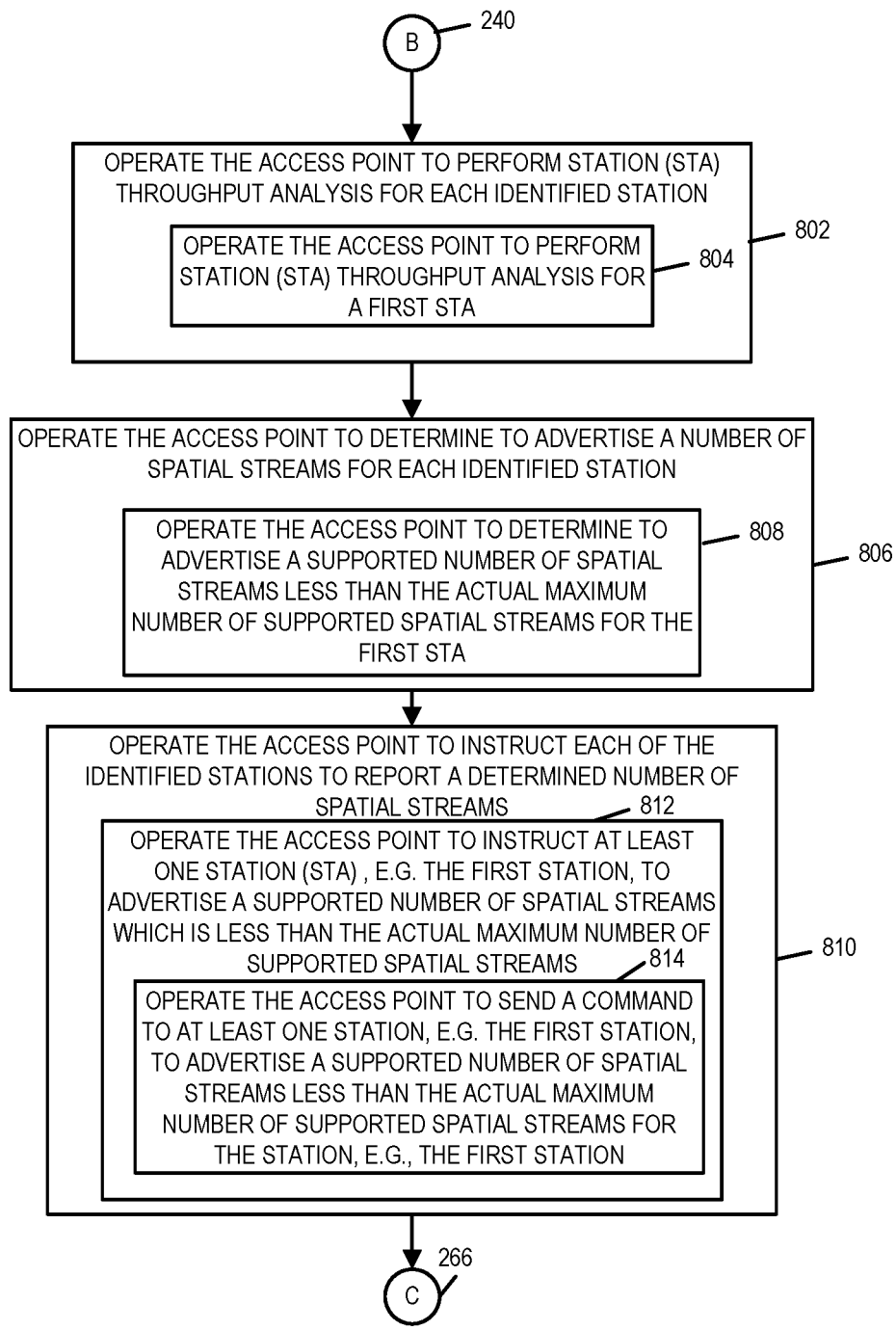
FIG. 8 is drawing of a third part of a flowchart of an exemplary method of operating a communications system, which is alternative to FIG. 2C, in accordance with an exemplary embodiment.

In some embodiments, the flowchart procedure of FIG. 2C is replaced by the alternative flowchart procedure of FIG. 8, and operation proceeds from step 236, via connecting node B 240 to step 802.

Retuning to step 242, in step 242 the access point determines if the determined average throughput for the STA being evaluated is less than or equal to a first bit rate, e.g., 312 Mbps. If the determination is the determined average throughput for the STA is less than the first bit rate, then operation proceeds from step 242, to step 243 in which the access point determines that the STA should advertise 1 for its number of spatial streams, as indicated by DTA 1, which represents determine to advertise 1. Operation proceeds from 243 to step 244, in which the access point sends a command to the STA commanding the STA to advertise 1 for its number of spatial streams, as part of a re-advertisement.

However, if the determination is the determined average throughput for the STA is not less than the first bit rate, then operation proceeds from step 242, to step 246. In step 246 the access point determines if the determined average throughput for the STA being evaluated is greater than the first bit rate, e.g., 312 Mbps, and less than or equal to a second bit rate, e.g., 624 Mbps. If the determination is the determined average throughput for the STA is greater than the first bit rate and less than or equal to the second bit rate, then operation proceeds from step 246, to step 248; otherwise, operation proceeds from step 246 to step 254. In step 248 the access point determines if the actual maximum spatial stream count for the STA being evaluated is less than 2. If the determination is that the actual maximum spatial stream count for the STA being evaluated is less than 2, then operation proceeds from step 248 to step 2491; otherwise, operation proceeds from step 248 to step 249. In step 2491 access point determines that the STA should advertise its actual maximum number of supported spatial streams, as indicated by DTA AM, which represents determine to advertise actual maximum. Operation proceeds from step 2491 to step 250, in which the access point sends a command to the STA being evaluated commanding the STA to advertise its maximum number of supported spatial streams, as part of a readvertisement. In step 249 the access point determines that the STA should advertise 2 for its number of spatial streams, as indicated by DTA 2, which represents determine to advertise 2. Operation proceeds from step 249 to step 252. In step 252 the access point sends a command to the STA being evaluated commanding the STA to advertise 2 for its number of spatial streams, as part of a readvertisement.

Retuning to step 254, in step 254 the access point determines if the determined average throughput for the STA being evaluated is greater than the second bit rate, e.g., 624 Mbps, and less than or equal to a third bit rate, e.g., 936 Mbps. If the determination is the determined average throughput for the STA is greater than the second bit rate and less than or equal to the third bit rate, then operation proceeds from step 254, to step 256; otherwise, operation proceeds from step 254 to step 260. In step 256 the access point determines if the actual maximum spatial stream count for the STA being evaluated is less than 3. If the determination is that the actual maximum spatial stream count for the STA being evaluated is less than 3, then operation proceeds from step 256 to step 2571; otherwise, operation proceeds from step 256 to step 257. In step 2571 access point determines that the STA should advertise its actual maximum number of supported spatial streams, as indicated by DTA AM, which represents determine to advertise actual maximum. Operation proceeds from step 2571 to step 250. In step 250 the access point sends a command to the STA being evaluated commanding the STA to advertise its maximum number of supported spatial streams, as part of a readvertisement. In step 257 the access point determines that the STA should advertise 3 for its number of spatial streams, as indicated by DTA 3, which represents determine to advertise 3. Operation proceeds from step 257 to step 258. In step 258 the access point sends a command to the STA being evaluated commanding the STA to advertise 3 for its number of spatial streams, as part of a readvertisement.

Retuning to step 260, in step 260 the access point determines if the determined average throughput for the STA being evaluated is greater than the third bit rate, e.g., 624 Mbps, and less than or equal to a fourth bit rate, e.g., 1248 Mbps. If the determination is the determined average throughput for the STA is greater than the third bit rate and less than or equal to the fourth bit rate, then operation proceeds from step 260, to step 262; otherwise, operation proceeds from step 260 to step 2631. In step 262 the access point determines if the maximum spatial stream count for the STA being evaluated is less than 4. If the determination is that the maximum spatial stream count for the STA being evaluated is less than 4, then operation proceeds from step 262 to step 2631; otherwise, operation proceeds from step 262 to step 263. In step 2631 the access point determines that the STA should advertise its actual maximum number of supported spatial streams, as indicated by DTA AM, which represents determine to advertise actual maximum. Operation proceeds from step 2631 to step 250. In step 250 the access point sends a command to the STA being evaluated commanding the STA to advertise its maximum number of supported spatial streams, as part of a readvertisement. In step 263 the access point determines that the STA should advertise 4 for its number of spatial streams, as indicated by DTA 4, which represents determine to advertise 4. Operation proceeds from step 263 to step 264. In step 264 the access point sends a command to the STA being evaluated commanding the STA to advertise 4 for its number of spatial streams, as part of a readvertisement.

Operation proceeds from step 244, step 250, step 252, step 258 or step 264, via connecting node C 266, to step 268. In step 268 the STA receives to the command to advertise a commanded value for its number of spatial streams, said commanded value being a value with is less than or equal to the actual maximum number of spatial streams supported by the STA. Step 268 includes step 2681 or step 2682 during an iteration of step 268. In step 2681 the STA receives a command to advertise less than the maximum number of spatial streams supported by the STA. In step 2682 the STA receives a command to advertise the actual maximum number of spatial streams supported by the STA. Operation proceeds from step 268 to step 270. In step 270 the STA advertises the access point commanded value for its number of supported spatial streams, as part of a readvertisement. Step 270 includes step 272 and step 274, one of which is performed during an iteration of step 270. In step 272 the STA advertises a commanded spatial stream value number which is less than the actual maximum number of spatial streams supported by the STA. In step 274 the STA advertises a commanded spatial stream value number which is the actual maximum number of spatial streams supported by the STA. Operation proceeds from step 270 to step 276.

In step 276 the access point receives the advertisement from the STA. Step 276 includes step 2761 and step 2762, one of which is executed during each iteration of step 276. In step 2761 the access point receives an advertised spatial stream value number which is less than the actual maximum number of spatial streams supported by the STA. In step 2762 the access point receives an advertised spatial stream value number which is the actual maximum number of spatial streams supported by the STA. In one example, step 276 including step 2761, and the access point receives a re-advertisement from the first station, e.g. STA 2 106, said re-advertisement indicating a second maximum number of spatial streams supported by the first station, e.g., 1, 2 or 3, said second maximum number of spatial streams being lower than said first maximum number of spatial streams, e.g., 4. Operation proceeds from step 276 to step 278, in which the access point stores the received advertised spatial stream count number for the STA. Operation proceeds from step 278 to step 279.

In step 279, the access point determines if a third predetermined amount of time, e.g., 15 minutes, has elapsed since the last CCA. If the determination that the third predetermined amount of time has not elapsed since the last CCA, then operation proceeds to the input of step 279. However, if the determination that the third predetermined amount of time has elapsed since the last CCA, then operation proceeds from step 279, via connecting node E 281 to the input of step 216.

Returning to step 282, in step 282 the access point allocates access point spatial streams to STAs based on the received advertisements from the STAs, each received advertisement from a STA communicating a number of spatial streams, said communicated number of spatial streams being a maximum number of spatial streams supported by the STA or a number less than the maximum number of spatial streams supported by the STA. Thus in step 282 the access point allocate AP spatial streams to stations based on advertisements of the maximum number of spatial streams supported by the individual stations transmitting advertisements to the access point, e.g., an advertisement of the actual maximum number of spatial streams supported by the an individual station (sometimes referred to as first maximum) and/or advertisement of a maximum number of spatial streams supported by an individual station which is less than the actual maximum (sometimes referred to as a second maximum). Step 282 includes step 284, in which the access point allocates one or more spatial streams to a first STA, said number of allocated spatial streams to the first STA being less than or equal to the received advertisement from the first STA, e.g., the most recently received re-advertisement from the 1st STA. Step 282 may, and sometimes does, include additional steps similar to step 284 corresponding to other STA being serviced by the access point. For example, step 282 may, and sometimes does, include step 286 in which the access point allocates one or more spatial streams to an Nth STA. said number of allocated spatial streams to the Nth STA being less than or equal to the received advertisement from the Nth STA, e.g. the most recently received re-advertisement from the Nth STA.

Operation proceeds from step 282 to steps 288 and 290. In some embodiments, operation also proceeds from step 282 to step 292 and 294. In step 288 the access point communicates with the first STA using the one or more spatial streams allocated to the first STA. In step 290 the first STA communicates with the AP using the one or more spatial streams allocated to the first STA. In step 292 the access point communicates with the Nth STA using the one or more spatial streams allocated to the Nth STA. In step 294 the Nth STA communicates with the AP using the one or more spatial streams allocated to the Nth STA.

Operation proceeds from steps 288, 290, and in some embodiments, steps 292 and 294, to step 296. In step 296 the access point determines if the access point should perform a reallocation of its spatial streams to STAs, e.g. based on newly received spatial stream advertisements form STAs and/or based on detected dropped STA(s) no longer requiring service from the AP. Operation proceeds from step 296 to step 298. In step 298 if the access point has determined to perform a reallocation of its spatial streams to STAs, then operation proceeds from step 298 to step 282; otherwise, operation proceeds from step 298 to the inputs of steps 288, 290, and in some embodiments, to the inputs of steps 292 and 294.

FIG. 3, comprising the combination of FIG. 3A, FIG. 3B, FIG. 3C, FIG. 3D and FIG. 3E, is a flowchart 300 of an exemplary method of operating a communications system, e.g., communications system 100 of FIG. 1, in accordance with an exemplary embodiment.

Operation of the exemplary method starts in step 302 in which the communications system is powered on and initialized. Operation proceeds from start step 302 to step 304, 310, 316, and via connecting node D 380 to step 382.

In step 304, an access point, e.g., access point 102 of FIG. 1, is operated to monitor to detect a new station to be serviced by the access point. Step 304 may, and sometimes does, include step 306, in which the access point receives an initial advertisement from a station, e.g., one of STA 1 104, STA 2 106, STA 3 108, STA 4 110, STA 5 112, STA 6 114, or STA 7 116, communicating a spatial stream count number of the station, which is the actual maximum number of spatial steams supported by the station, e.g., communicating (1, 4, 1, 4, 2, 4, or 2) respectively. For example, in step 306 the access point receives a first (e.g., initial) advertisement from a first station, e.g., STA 2 106, indicating a first maximum number of spatial streams, e.g., 4 streams, supported by the first station, which is the actual number of the streams supported by the first station. In response to the reception of step 306, operation proceeds from step 306, to step 308, in which the AP stores the actual maximum number of spatial streams supported by the station with information identifying the station. Step 304 is performed on an ongoing basis.

In step 310, a station (STA) is operated to collect throughput metrics for a first predetermined time interval, e.g., 15 minutes. Operation proceeds from step 310 to step 312. In step 312 the station is operated to store the throughput metrics in a STA based analytics database 314. Operation processed from step 312 to step 310, in which the STA collects throughput metrics for another iteration of the first predetermined time interval, and then in step 312 the STA stores the collected throughput metrics in database 214. Steps 310 and 312 are repeated on an ongoing basis. Each of the STAs being serviced by the AP performs steps 310 and 312.

In step 316 the access point performs a clear channel assessment (CCA). Step 316 includes steps 318 and 320. In step 318 the access point determines a CCA channel utilization percentage. Operation proceeds from step 318 to step 320. In step 320 the access point determines a total station (STA) spatial stream count. Step 320 includes step 322 in which the access point sums the most recently advertised spatial stream count numbers from the stations (STAs) being serviced by the access point to determine a total STA spatial stream count. Operation proceeds from step 316 to step 324.

In step 324, if the determined CCA channel utilization is greater than a first predetermined value, e.g., 75%, then operation proceeds from step 324, to step 326. However, if the determined CCA channel utilization is not greater than the first predetermined value, e.g., 75%, then operation proceeds from step 324, to step 325. In step 325 the access point waits a second predetermine amount of time, e.g., 15 minutes. Then, operation proceeds from step 325 to step 316, in which the access point performs another CCA.

Returning to step 326, in step 326 the access point sends a signal, e.g., a broadcast signal to one or more or all of the STA(s) being serviced by the access point to evaluate throughput metrics and re-advertise a number of spatial streams. Operation proceeds from step 326, via connecting node A 328 to step 330.

In step 330 the STA receives a signal, e.g., a broadcast signal, directed to one or more or all of the STA(s) being service by the access point, to evaluate throughput metrics and re-advertise a number of spatial streams. Operation proceeds from step 330 to step 332.

In step 332 the STA retrieves, e.g., from analytics database 314, the throughput metrics corresponding the STA for evaluation. Operation proceeds from step 332 to step 334, in which the STA evaluates the retrieved throughput metrics for the STA. Step 334 includes step 335 in which the STA, e.g., a first station (STA) performs a station throughput analysis for the station, e.g., for the first station. Step 335 includes step 336, in which the STA, e.g., the first station, determines an average throughput, e.g., an average data throughput for the STA, e.g., the first STA, when communicating with the access point. Operation proceeds from step 334, via connecting node B 338, to step 340.

Figure 3A:
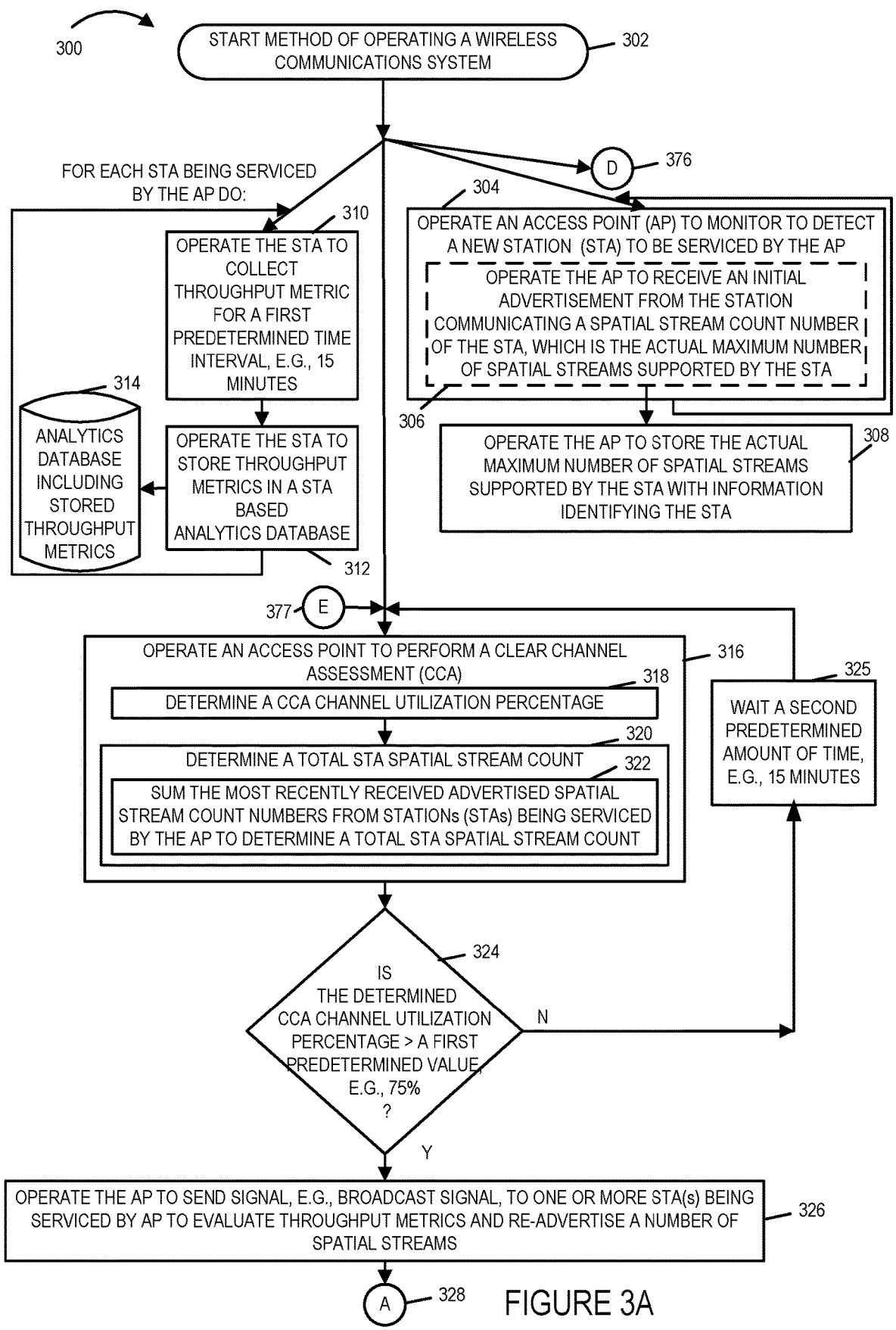
FIG. 3A is a first part of a flowchart of an exemplary method of operating a communications system in accordance with an exemplary embodiment.
Figure 3B:
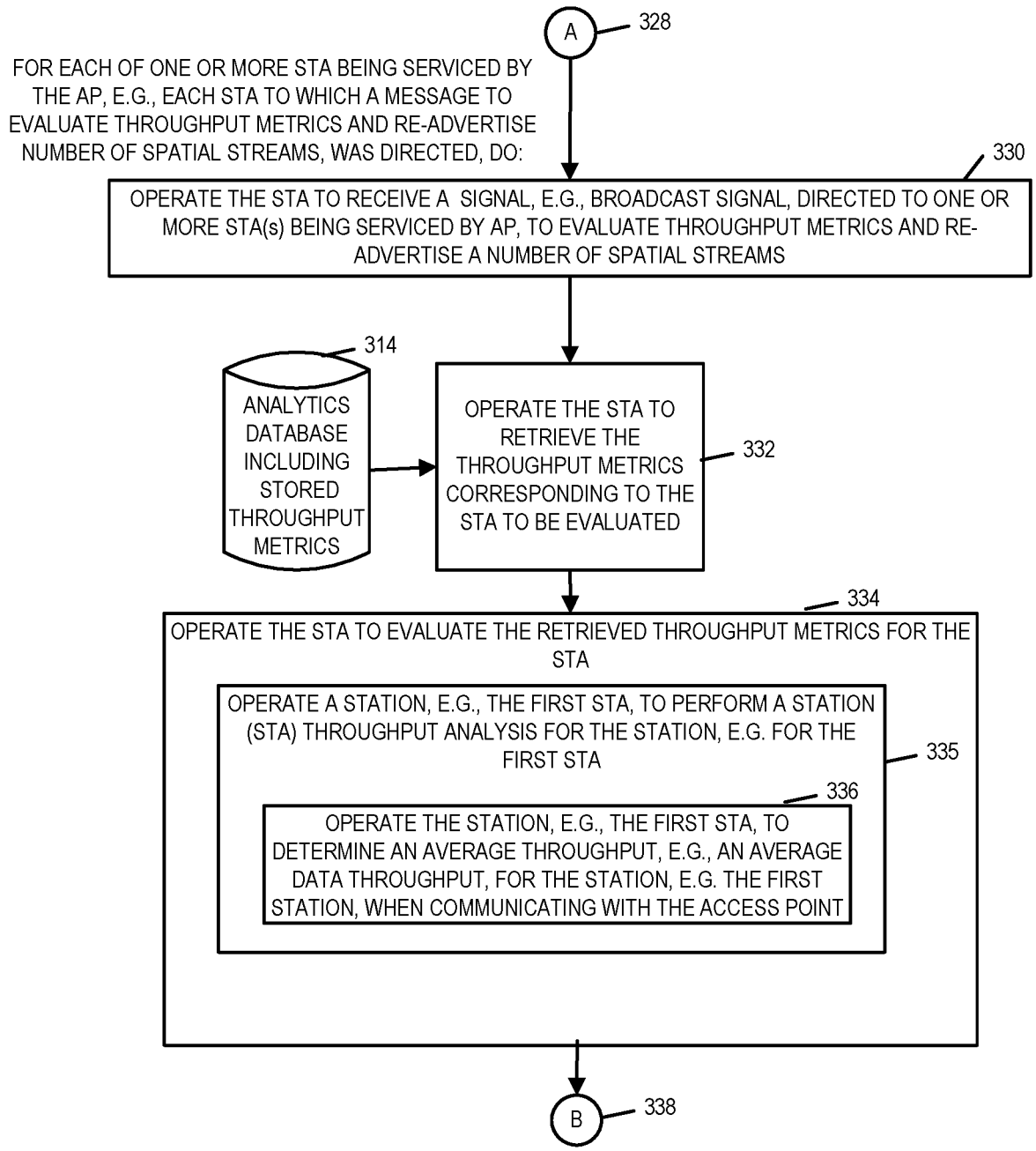
FIG. 3B is a second part of a flowchart of an exemplary method of operating a communications system in accordance with an exemplary embodiment.
Figure 3C:
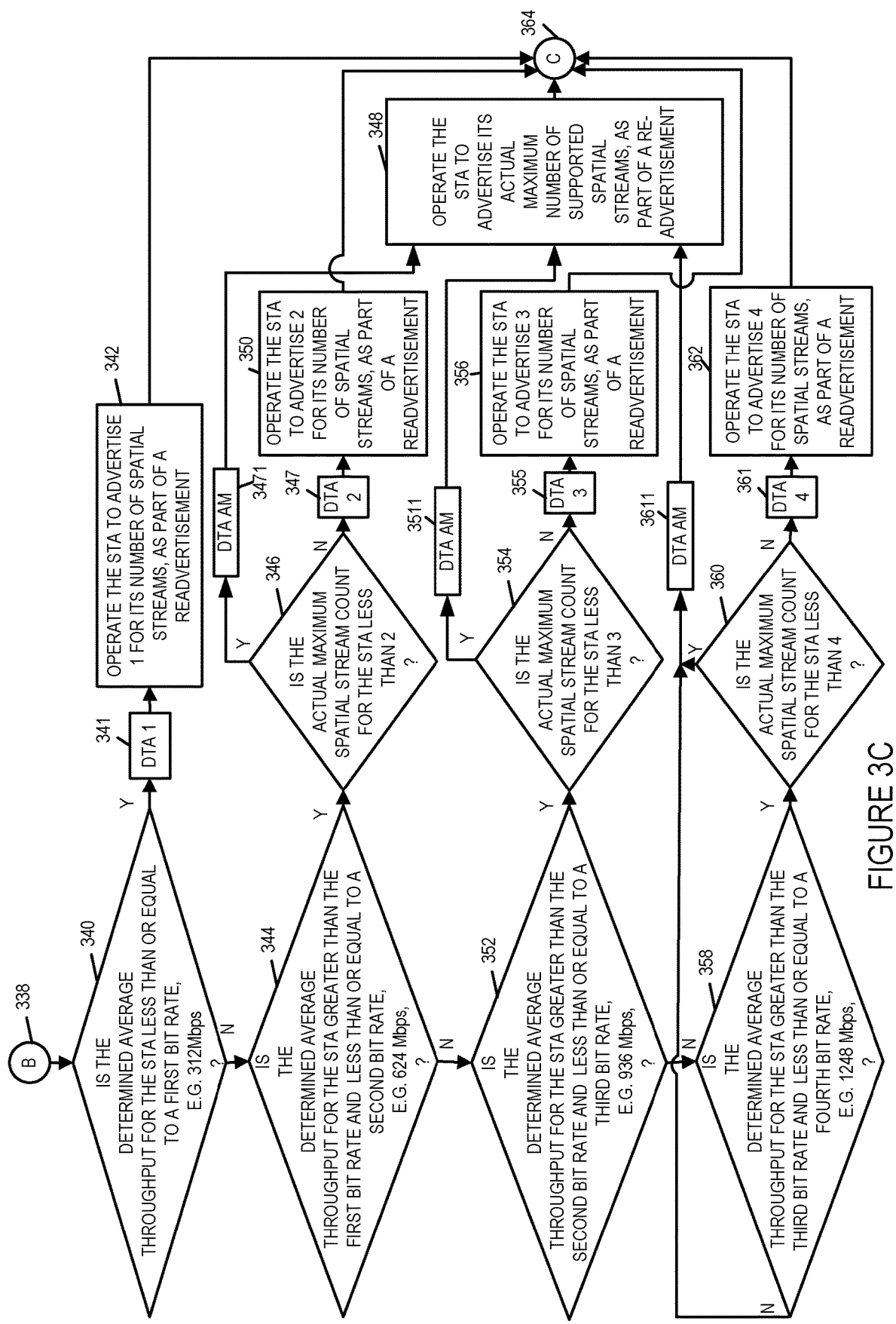
FIG. 3C is a third part of a flowchart of an exemplary method of operating a communications system in accordance with an exemplary embodiment.
Figure 9:
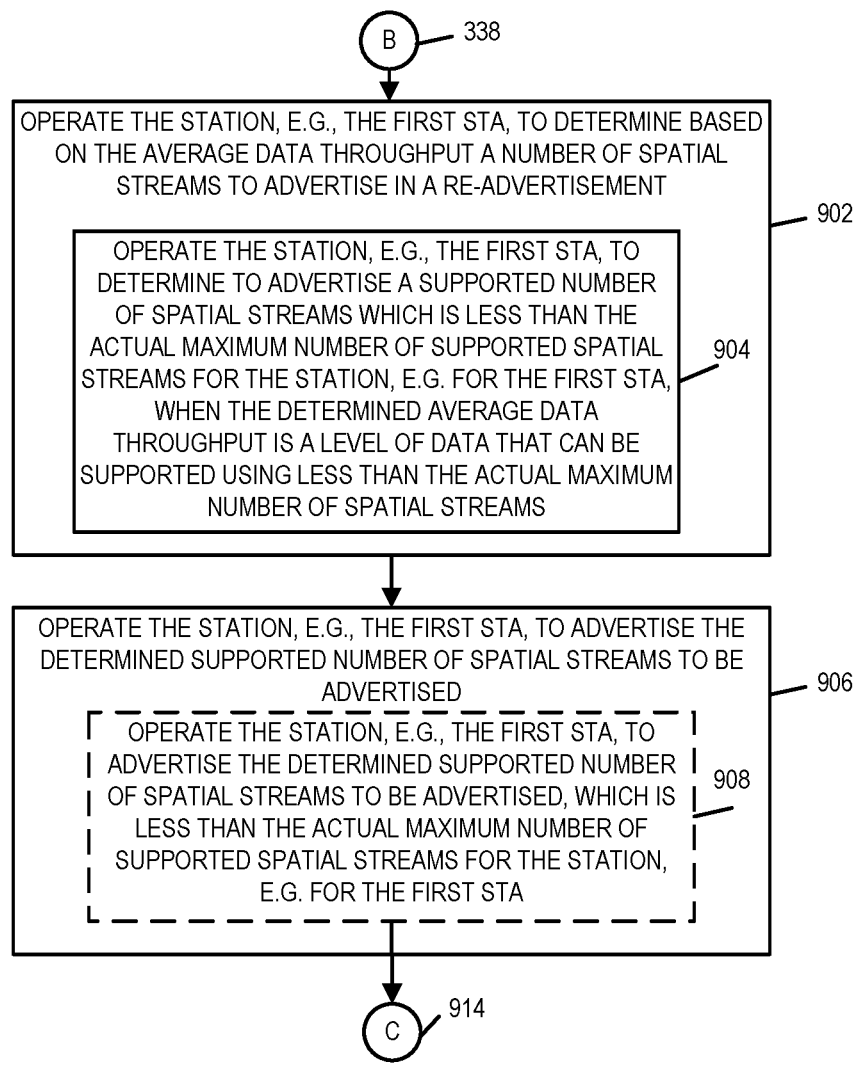
FIG. 9 is drawing of a third part of a flowchart of an exemplary method of operating a communications system, which is alternative to FIG. 3C, in accordance with an exemplary embodiment.

In some embodiments, the method of the flowchart FIG. 3C is replaced by the alternative method of the flowchart of FIG. 9, and operation proceeds from step 334, via connecting node B 338 to step 902.

Returning to step 340, in step 340 the STA determines if the determined average throughput for the STA is less than or equal to a first bit rate, e.g., 312 Mbps. If the determination is the determined average throughput for the STA is less than the first bit rate, then operation proceeds from step 340, to step 341. In step 341 the STA determines to advertise 1 for its number of spatial streams, as indicated by DTA 1, which represents determines to advertise 1. Operation proceeds from step 341 to step 342. In step 342 the STA advertises 1 for its number of spatial streams, as part of a re-advertisement.

However, if the determination is the determined average throughput for the STA is not less than the first bit rate, then operation proceeds from step 340, to step 344. In step 344 the STA determines if the determined average throughput for the STA is greater than the first bit rate, e.g., 312 Mbps, and less than or equal to a second bit rate, e.g., 624 Mbps. If the determination is the determined average throughput for the STA is greater than the first bit rate and less than or equal to the second bit rate, then operation proceeds from step 344, to step 346; otherwise, operation proceeds from step 344 to step 352. In step 346 the STA determines if the actual maximum spatial stream count for the STA is less than 2. If the determination is that the actual maximum spatial stream count for the STA is less than 2, then operation proceeds from step 346 to step 3471; otherwise operation proceeds from step 346 to step 347. In step 3471 the STA determines to advertises its actual maximum number of supported spatial streams, as indicated by DTA AM, which represented determines to advertise actual maximum. Operation proceeds from step 3471 to step 348. In step 348 the STA advertises its actual maximum number of supported spatial streams, as part of a readvertisement. In step 347 the STA determines to advertise 2 for its number of spatial streams, as indicated by DTA 2, which represents determines to advertise 2. Operation proceeds from step 347 to step 350. In step 350 the STA advertises 2 for its number of spatial streams, as part of a readvertisement.

Retuning to step 352, in step 352 the STA determines if the determined average throughput for the STA is greater than the second bit rate, e.g., 624 Mbps, and less than or equal to a third bit rate, e.g., 936 Mbps. If the determination is the determined average throughput for the STA is greater than the second bit rate and less than or equal to the third bit rate, then operation proceeds from step 352, to step 354; otherwise, operation proceeds from step 352 to step 358. In step 354 the STA determines if the actual maximum spatial stream count for the STA is less than 3. If the determination is that the actual maximum spatial stream count for the STA is less than 3, then operation proceeds from step 354 to step 3511; otherwise, operation proceeds from step 354 to step

355. In step 3511 the STA determines to advertise its actual maximum number of supported spatial streams, as indicated by DTA AM, which represents determines to advertise actual maximum. Operation proceeds from step 3511 to step 348. In step 348 the STA advertise its actual maximum number of supported spatial streams, as part of a readvertisement. In step 355 the STA determines to advertise 3 for its number of spatial streams, as indicated by DTA 3, which represents determines to advertise 3. Operation proceeds from step 355 to step 356. In step 356 the STA advertises 3 for its number of spatial streams, as part of a readvertisement.

Returning to step 358, in step 358 the STA determines if the determined average throughput for the STA is greater than the third bit rate, e.g., 936 Mbps, and less than or equal to a fourth bit rate, e.g., 1248 Mbps. If the determination is the determined average throughput for the STA is greater than the third bit rate and less than or equal to the fourth bit rate, then operation proceeds from step 358, to step 360; otherwise operation proceeds from step 358 to step 3611. In step 360 the STA determines if the actual maximum spatial stream count for the STA is less than 4. If the determination is that the actual maximum spatial stream count for the STA is less than 4, then operation proceeds from step 358 to step 3611; otherwise, operation proceeds from step 360 to step 361. In step 3611 the STA determines to advertise its actual maximum number of supported spatial streams, as indicated by DTA AM, which represents determines to advertise actual maximum. Operation proceeds from step 3611 to step 348. In step 348 the STA advertises its maximum number of supported spatial streams, as part of a readvertisement. In step 361 the STA determines to advertise 4 for its number of spatial streams, as indicated by DTA 4, which represents determines to advertise 4. Operation proceeds from step 361 to step 362. In step 362 STA advertises 4 for its number of spatial streams, as part of a readvertisement.

Operation proceeds from step 342, step 348, step 350, step 356 or step 362, via connecting node C 364, to step 368.

In step 368 the access point receives the re-advertisement from the STA. Step 368 includes step 370 and step 372, one of which is performed during each iteration of step 368. In step 370 the access point receives a spatial stream value number which is less than the actual maximum number of spatial streams supported by the STA. In step 372 the access point receives a spatial stream value number which is the actual maximum number of spatial streams supported by the STA. In one example, step 368 includes step 370, and the access point receives a re-advertisement from the first station, e.g. STA 2 106, said re-advertisement indicating a second maximum number of spatial streams supported by the first station, e.g., 1, 2 or 3, said second maximum number of spatial streams being lower than said first maximum number of spatial streams, e.g., 4. Operation proceeds from step 368 to step 374, in which the access point stores the received advertised spatial stream count number for the STA. Operation proceeds from step 374 to step 375.

In step 375, the access point determines if a third predetermined amount of time, e.g., 15 minutes, has elapsed since the last CCA. If the determination that the third predetermined amount of time has not elapsed since the last CCA, then operation proceeds to the input of step 375. However, if the determination that the third predetermined amount of time has elapsed since the last CCA, then operation proceeds from step 375, via connecting node E 377 to the input of step 316.

Figure 3D:
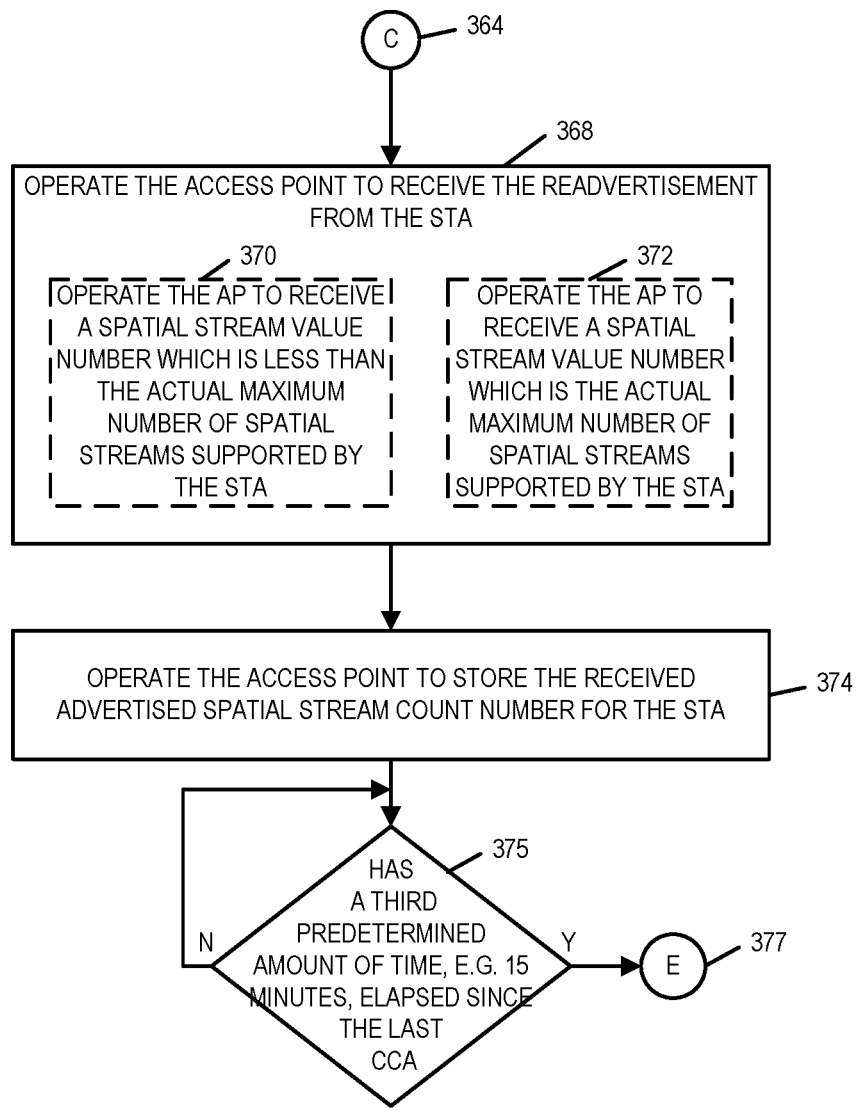
FIG. 3D is a fourth part of a flowchart of an exemplary method of operating a communications system in accordance with an exemplary embodiment.

The operations of FIG. 3B and FIG. 3C (or alternatively FIG. 9) may be, and sometimes are, performed by one or more or all of the STAs being service by the access point. In some embodiments, the operations of FIG. 3C (or alternatively FIG. 9) and FIG. 3D are only performed by STAs which support more than one spatial stream. In some such embodiments, the operations of FIG. 3B and FIG. 3C (or alternatively FIG. 9) are only performed by STAs which support more than one spatial stream and which correspond to a set of service levels.

In some embodiments, steps 326 and 330 are omitted, and an individual STA decides on its own, e.g., without being triggered by the access point: i) whether or not to evaluate its throughput metrics, ii) when to evaluate its throughput metrics, iii) whether or not to re-advertise a spatial stream value, and/or iv) when to re-advertise a spatial stream value. In some such embodiments, STAs, which support multiple spatial streams, perform evaluation and re-advertisement in accordance with a predetermined timing structure.

Returning to step 380, in step 380 the access point allocates access point spatial streams to STAs based on the received advertisements from the STAs, each received advertisement from a STA communicating a number of spatial streams, said communicated number of spatial streams being an actual maximum number of spatial streams supported by the STA or a number less than the actual maximum number of spatial streams supported by the STA. Thus in step 380 the access point allocate AP spatial streams to stations based on advertisements of the maximum number of spatial streams supported by the individual stations transmitting advertisements to the access point, e.g., an advertisement of the actual maximum number of spatial streams supported by an individual station (sometimes referred to as a first maximum) and/or an advertisement of a maximum number of spatial streams supported by the station which is less than the actual maximum (sometimes referred to as a second maximum). Step 380 includes step 382, in which the access point allocates one or more spatial streams to a first STA, said number of spatial streams allocated to the first STA being less than or equal to the advertised number of spatial streams from the first STA, e.g., less than or equal to the number of spatial streams communicated in the most recently received re-advertisement from the first STA. Step 380 may, and sometimes does, include additional steps similar to step 382 corresponding to other STA(s) being serviced by the access point. For example, step 380 may, and sometimes does, include step 384 in which the access point allocates one or more spatial streams to an Nth STA, said number of spatial streams allocated to the Nth STA being less than or equal to the advertised number of spatial streams received from the Nth STA, e.g., less than or equal to the number of spatial streams communicated in the most recently received re-advertisement from the Nth STA.

Operation proceeds from step 380 to steps 386 and 388. In some embodiments, operation also proceeds from step 380 to step 390 and 392. In step 386 the access point communicates with the first STA using the one or more spatial streams allocated to the first STA. In step 388 the first STA communicates with the AP using the one or more spatial streams allocated to the first STA. In step 390 the access point communicates with the Nth STA using the one or more spatial streams allocated to the Nth STA. In step 392 the Nth STA communicates with the AP using the one or more spatial streams allocated to the Nth STA.

Operation proceeds from steps 386, 388, and in some embodiments, steps 390 and 392, to step 394. In step 394 the access point determines if the access point should perform a reallocation of its spatial streams to STAs, e.g., based on newly received spatial stream advertisements form STAs and/or based on detected dropped STA(s) no longer requiring service from the AP. Operation proceeds from step 394 to step 396. In step 396 if the access point has determined to perform a reallocation of its spatial streams to STAs, then operation proceeds from step 396 to step 380; otherwise, operation proceeds from step 396 to the inputs of steps 386, 388, and in some embodiments, to the inputs of steps 390 and 392.

Figure 4:
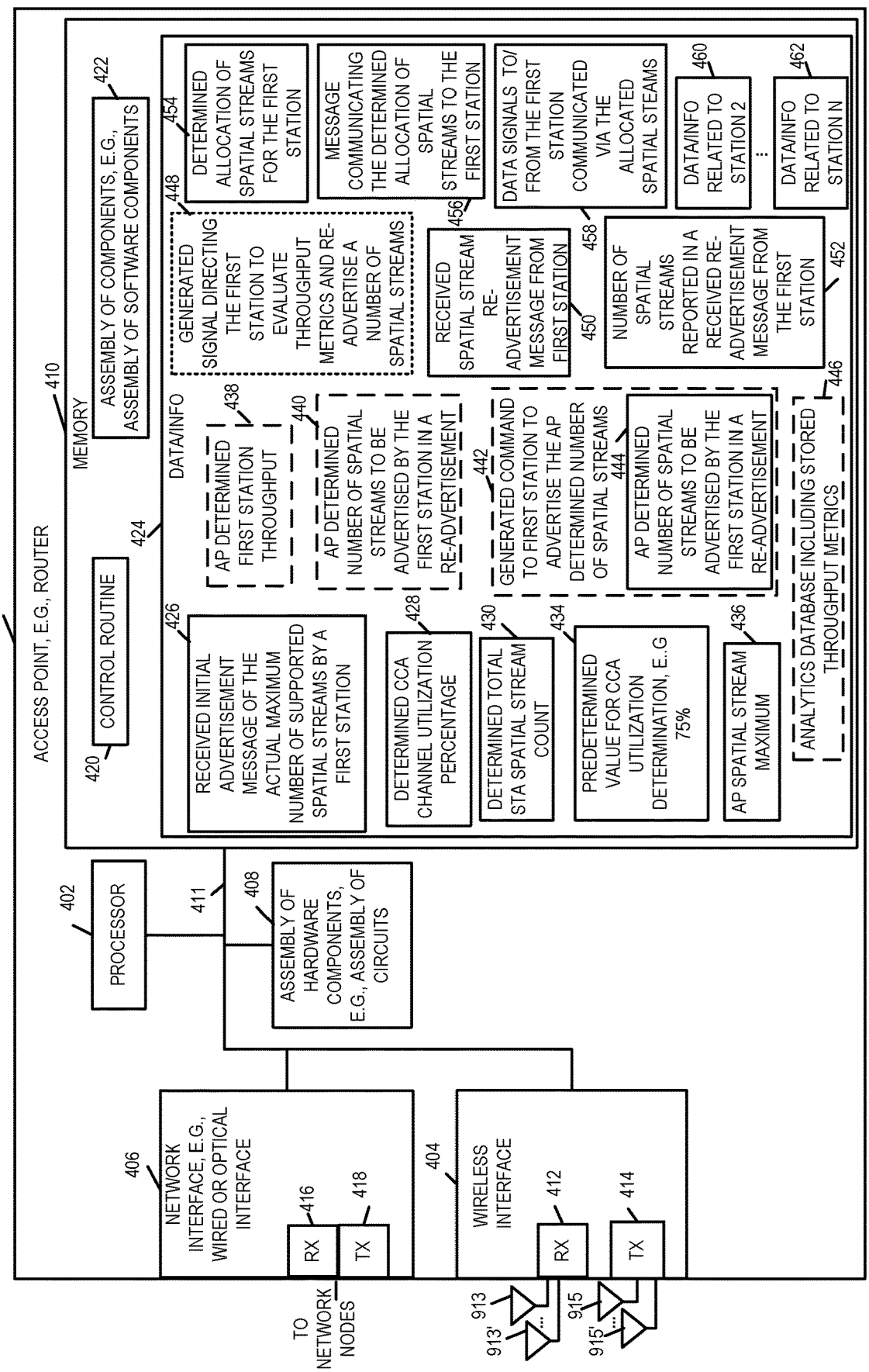
FIG. 4 is a drawing of an exemplary access point (AP) in accordance with an exemplary embodiment.

FIG. 4 is a drawing of an exemplary access point (AP) 400, e.g., a wireless router supporting multiple spatial streams, in accordance with an exemplary embodiment. In some embodiments, exemplary base station 400 of FIG. 4 implements: steps of the exemplary method of flowchart 200 of FIG. 2, and/or steps of the exemplary method of flowchart 300 of FIG. 3. Access point 400 is, e.g., access point 102 of FIG. 1, which is an 8 spatial stream router.

Access point 400 includes a processor 402, e.g. a CPU, wireless interface 404, a network interface 406, e.g., a wired or optical interface, an assembly of hardware components 408, e.g., an assembly of circuits, and memory 410 coupled together via a bus 411 over which the various elements may interchange data and information.

Network interface 406 includes a receiver 416 and a transmitter 418. Network interface 406 to coupled to network nodes, e.g., via a backhaul network and/or the Internet. Wireless interface 404 includes a wireless receiver 412 and a wireless transmitter 414. Wireless receiver 412 is coupled to one or more receive antennas (receive antenna 1 413, . . . , receive antenna n1 413') via which the access point 400 can receive wireless signals, e.g., wireless signals from stations (STAs). Wireless transmitter 414 is coupled to one or more transmit antennas (transmit antenna 1 415, . . . transmit antenna n2 415') via which access point 400 can transmit wireless signals to stations (STAs). In some embodiments, one or more antennas are used for both transmit and receive.

Memory 410 includes a control routine 420, e.g., for controlling basic functions of the access point, an assembly of components 422, e.g., an assembly of software components, and data/information 424. Data/information 424 includes a received initial advertisement message communicating the actual maximum number of supported spatial streams by a first station (first STA) 426, a determined CCA channel utilization percentage 428, a determined total STA spatial stream count 430, a predetermined value 434 for a CCA utilization determination, e.g., 75%, an AP spatial stream maximum 436, e.g., 8 for AP 102 of FIG. 1, a received spatial stream re-advertisement message from a first station 450, a number o spatial streams reported in a received re-advertisement message from the first station 452, a determined allocation of spatial streams for the first station 454, a generated message communicating the determined allocation of spatial streams to the first station, data signal to/from the first station communicated via allocated spatial streams.

In some embodiments, e.g., an embodiment implementing the method of flowchart 200 of FIG. 2, data/information 424 further includes analytics database 446 including stored throughput metrics, an AP determined first station throughput 438, an AP determined number of spatial streams to be advertised by the first station in a re-advertisement 440, and a generated command 442 to the first station to advertise the AP determined number of spatial streams. Generated command 442 includes the AP determined number of spatial streams to be advertised by the first station in a re-advertisement 444, which is the same value as information 440.

In some embodiments, e.g., an embodiment implementing the method of flowchart 300 of FIG. 3, data/information 424 further includes a generated signal 448 directing the first station to evaluate throughput metrics and advertise a number of spatial streams. In some embodiments, the generated signal 448 is a broadcast signal directed to a plurality of stations, e.g. a plurality of stations including the first station.

Data/information 424 further includes data and information related to additional stations (data/information related to station 2 460, . . . , data information related to station n 462) in addition to the first station, which is similar to the data/information described with respect to the first station.

Figure 5:
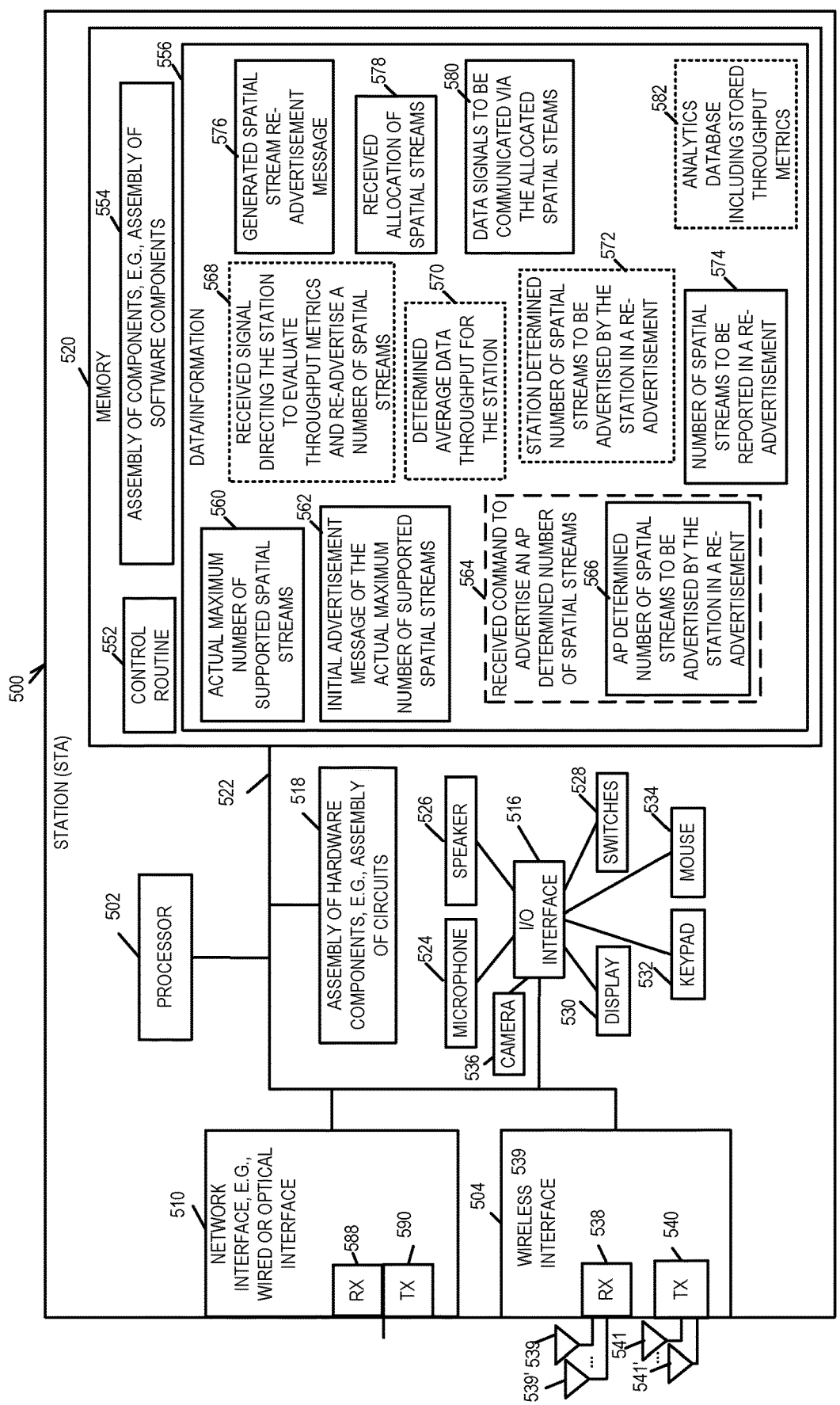
FIG. 5 is a drawing of an exemplary station (STA) in accordance with an exemplary embodiment.

FIG. 5 is a drawing of an exemplary station (STA) in accordance with an exemplary embodiment. Station (STA) 500 is, e.g., one of the STAs (106, 110, 112, 114, 116) of system 100 of FIG. 1. STA 500 includes a processor 502, a wireless interface 504, a network interface 510, an I/O interface 516, an assembly of hardware components 518, e.g., an assembly of circuits, and memory 520 coupled together via a bus 522 over which the various elements may interchange data and information. Wireless interface 504 includes a wireless receiver 538 coupled to one or more receive antennas (receive antenna 1 539, . . . , receive antenna n3 539') via which the STA 500 may receive wireless signals, e.g., wireless downlink signals from an access point, e.g., AP 102. Wireless interface 504 includes a wireless transmitter 540 coupled to one or more transmit antennas (transmit antenna 1 541, . . . , transmit antenna n4 541') via which the STA may transmit wireless signals, e.g., wireless uplink signals to an access point, e.g., AP 102. In some embodiments, one or more of the antennas are used for both transmit and receive. Network interface 510, e.g., a wired or optical interface, includes a receiver 588 and a transmitter 590.

STA 500 further includes a microphone 524, a speaker 526, switches 528, a mouse 534, a keypad 532, a display 530 and a camera 536 coupled to/O interface 516, via which the various input/output devices (524, 526, 528, 530, 532, 534, 536) may communicate with the other elements (502, 504, 510, 518, 520) of the STA 500. Memory 520 includes a control routine 552, an assembly of components 554, e.g., an assembly of software components, and data/information 556.

Data/information 556 includes an actual maximum number 560 of supported spatial streams for station 500, a generated initial advertisement message including the actual maximum number of supported spatial streams 562, which is to be communicated to an access point, a number of spatial streams to be reported in a re-advertisement 574, a generated spatial stream re-advertisement message 576, a received allocation of spatial streams 578, and data signals to be communicated via the allocated spatial streams 580. In some embodiments, e.g., an embodiment implementing steps of the method of flowchart 200 of FIG. 2, data/information 556 further includes a received command to advertise an AP determined number of spatial streams 564 including the AP determined number of spatial streams to be advertised in a re-advertisement 566. In some embodiments, e.g., an embodiment implementing steps of the method of flowchart 300 of FIG. 3, data/information 556 further includes a received signal 568 directing the station 500 to evaluate throughput metrics and re-advertise a number of spatial streams, a determined average throughput 570 for the station 500, a station determined number of spatial streams to be advertised by the station in a re-advertisement 572, and an analytics database 582 including stored throughput metrics.

Figure 6A:
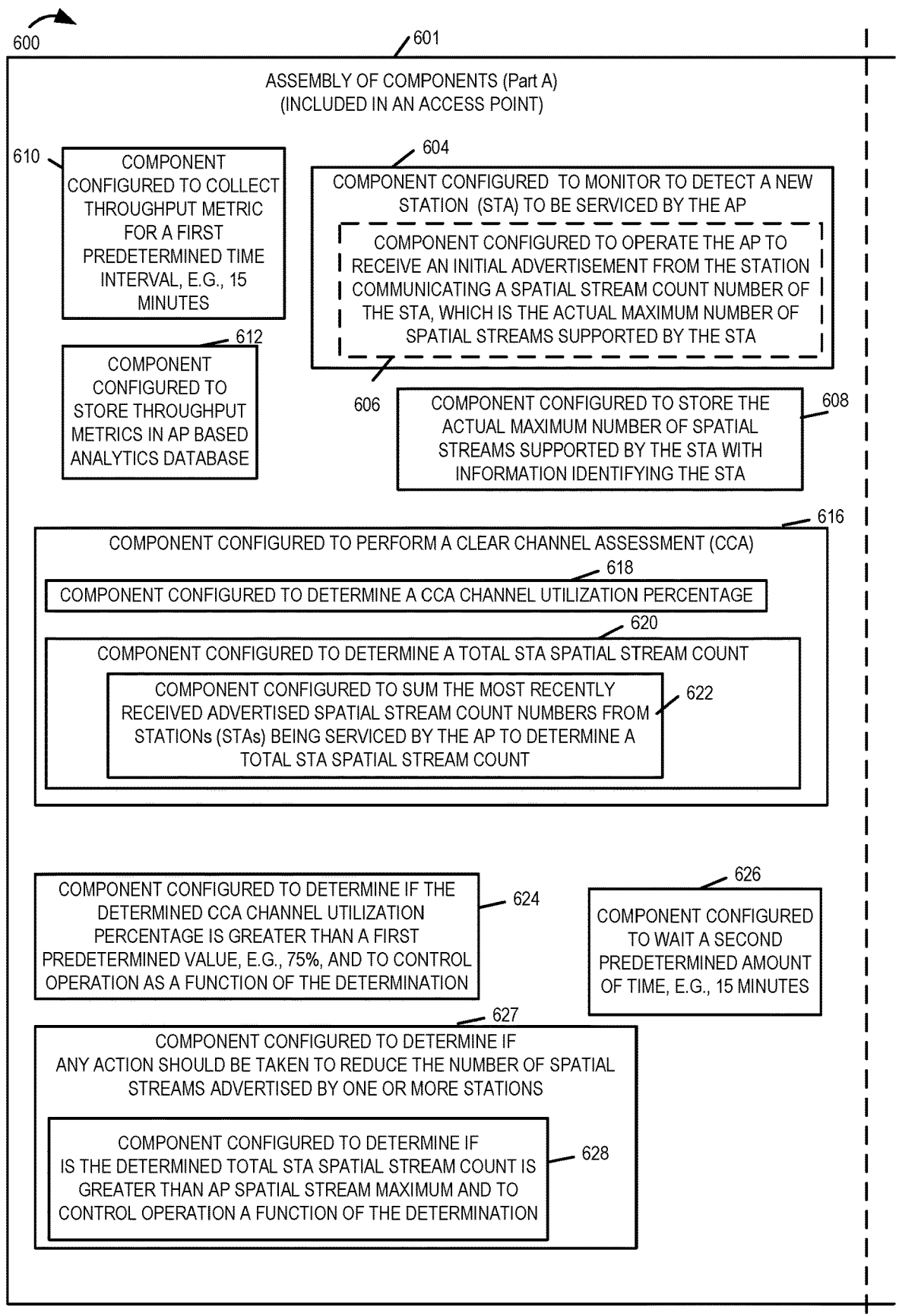
FIG. 6A is a drawing of a first part an exemplary assembly of components which may be included in an access point in accordance with an exemplary embodiment.
Figure 6B:
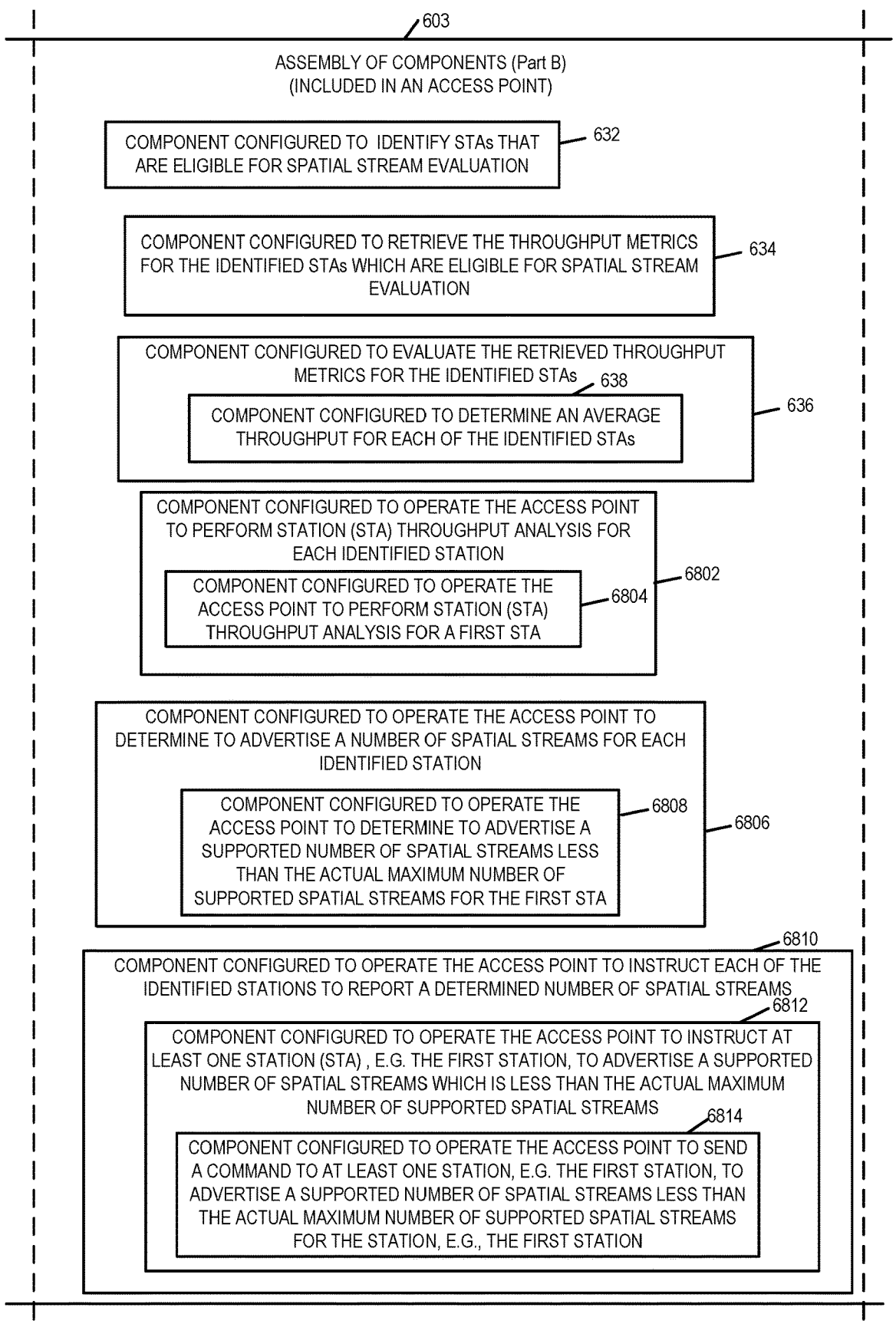
FIG. 6B is a drawing of a second part of an exemplary assembly of components which may be included in an access point in accordance with an exemplary embodiment.
Figure 6C:
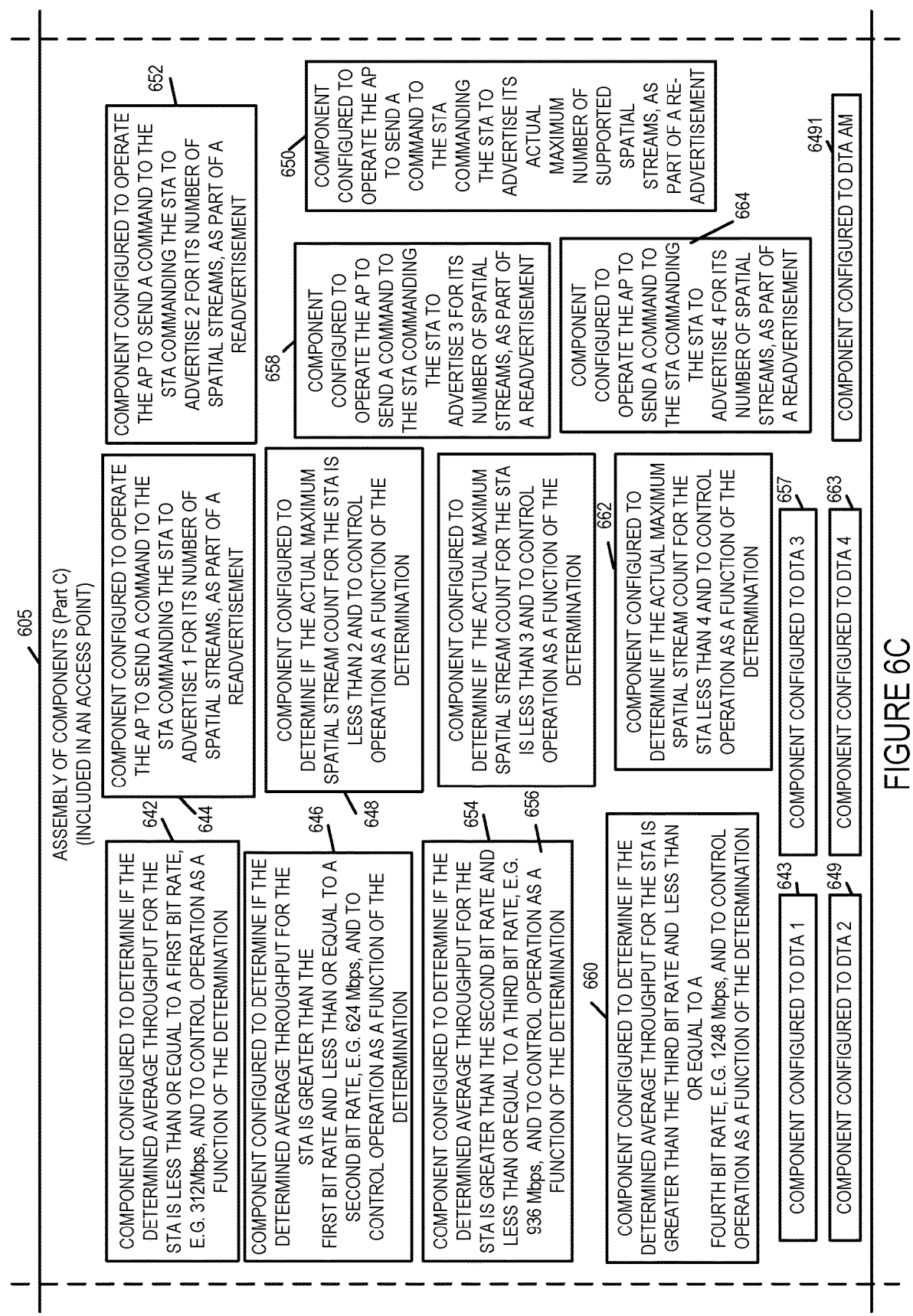
FIG. 6C is a drawing of a third part of an exemplary assembly of components which may be included in an access point in accordance with an exemplary embodiment.
Figures 6, 6D:
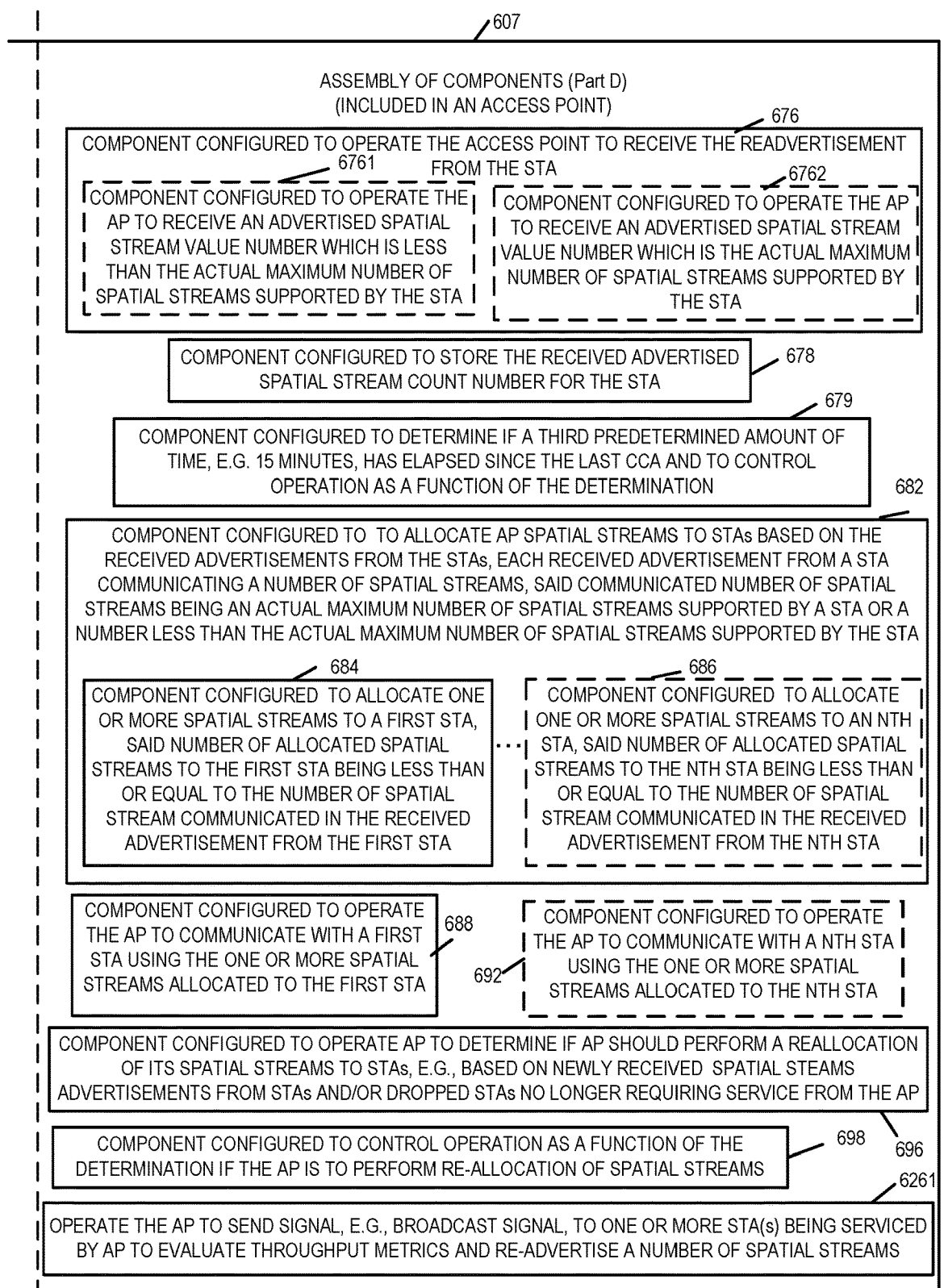
FIG. 6D is a drawing of a fourth part of an exemplary assembly of components which may be included in an access point in accordance with an exemplary embodiment.
FIG. 6 comprises the combination of FIG. 6A, FIG. 6B, FIG. 6C and FIG. 6D.

FIG. 6 is a drawing of an exemplary assembly of components 600 which may be included in an access point in accordance with an exemplary embodiment. FIG. 6, comprising the combination of FIG. 6A, FIG. 6B, FIG. 6C and FIG. 6D, is a drawing of an exemplary assembly of components 600, comprising Part A 601, Part B 603, Part C 605 and Part D 607, in accordance with an exemplary embodiment. Exemplary assembly of components 600 which may be included in an access point, e.g., a router supporting multiple spatial steams, such as the exemplary access point 400, of FIG. 4, and which implement steps of an exemplary method, e.g., steps of the method of the flowchart 200 of FIG. 2 and/or steps of the method of the flowchart 300 of FIG. 3.

Assembly of components 600 can be, and in some embodiments is, used in access point 400 of FIG. 4, and/or access point 102 of FIG. 1. The components in the assembly of components 600 can, and in some embodiments are, implemented fully in hardware within the processor 402, e.g., as individual circuits. The components in the assembly of components 600 can, and in some embodiments are, implemented fully in hardware within the assembly of components 408, e.g., as individual circuits corresponding to the different components. In other embodiments some of the components are implemented, e.g., as circuits, within the processor 402 with other components being implemented, e.g., as circuits within assembly of components 408, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 410 of the access point 400, with the components controlling operation of the access point to implement the functions corresponding to the components when the components are executed by a processor, e.g., processor 402. In some such embodiments, the assembly of components 600 is included in the memory 410 as assembly of components 422. In still other embodiments, various components in assembly of components 600 are implemented as a combination of hardware and software, e.g., with another circuit external to the processor 402 providing input to the processor 402 which then under software control operates to perform a portion of a component's function. While processor 402 is shown in the FIG. 4 embodiment as a single processor, e.g., computer, it should be appreciated that the processor 402 may be implemented as one or more processors, e.g., computers.

When implemented in software the components include code, which when executed by the processor 402, configure the processor 402 to implement the function corresponding to the component. In embodiments where the assembly of components 400 is stored in the memory 410, the memory 410 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the access point 400, or elements therein such as the processor 402, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g., steps of: the method of flowchart 200 of FIG. 2, and/or the method the method of flowchart 300 of FIG. 3 and/or described or shown with respect to any of the other figures.

Assembly of components 600 includes a component 604 configured to monitor to detect a new station (STA) to be serviced by the AP. Component 604 includes a component 606 configured to operate the AP to receive an initial advertisement from the station communicating a spatial stream count number of the STA, which is the actual maximum number of spatial streams supported by the STA. Assembly of components 600 further includes a component 608 configured to store the actual maximum number of spatial streams supported by the STA with information identifying the STA, a component 610 configured to collect throughput metrics for a first predetermined time interval, e.g., 15 minutes, a component 612 configured to store throughput metrics in an AP based analytics database, and a component 616 configured to perform a clear channel assessment (CCA). Component 616 includes a component 618 configured to determine a CCA channel utilization percentage and a component 620 configured to perform a total STA spatial stream count. Component 620 includes a component 622 configured to sum the most recently received advertised spatial stream count numbers from stations (STAs) being serviced by the AP to determine a total STA spatial stream count. Assembly of components 600 further includes a component 624 configured to determine if the determined CCA channel utilization is greater than a first predetermined value, e.g. 75%, and to control operation as a function of the determination, a component 626 configured to wait a second predetermined amount of time, e.g., 15 minutes, e.g., in response to a determination that the CCA utilization is not greater than the first predetermined value, and a component 627 configured to determine if any action should be take to reduce the number of spatial streams advertised by one or more stations, e.g., in response to a determination that the CCA utilization is greater than the first predetermined value. Component 628 includes a component 628 configured to determine if the determined total STA spatial stream count is greater than the AP spatial stream maximum and to control operation as a function of the determination.

Assembly of components 600 further includes a component 632 configured to identify STAs that are eligible for spatial stream evaluation, a component 634 configured to retrieve the throughput metrics from the identified STAs which are eligible for spatial stream evaluation, and a component 636 configured to evaluate the retrieved throughput metrics for the identified STAs. Component 636 includes a component 638 configured to determine an average throughput for each of the identified STAs.

Assembly of components 600 further includes a component 6802 configured to operate the access point to perform station (STA) throughput analysis for each identified STA. Component 6802 includes a component 6804 configured to operate the access point to perform station (STA) throughput analysis for a first STA. Assembly of component 600 further includes a component 6806 configured to operate the access point to determine to advertise a number of spatial streams for each identified station. Component 6806 includes a component 6808 configured to operate the access point to determine to advertise a supported number of spatial streams, (e.g., a second maximum number of spatial streams,) less than the actual maximum number of supported spatial streams (e.g., the first (e.g., initial) maximum number of spatial streams) for the first STA.

Assembly of components 600 further includes a component 6810 configured to operate the access point to instruct each of the identified stations to report a determined number of spatial streams. Component 6810 includes component 6812 configured to operate the access point to instruct at least one station (STA), e.g. the first station (e.g., STA 2 106), to advertise a supported number of spatial streams (e.g., a second maximum number of spatial streams) which is less than the actual maximum number of supported spatial streams (e.g., the first (e.g., initial) maximum number of supported spatial streams). Component 6812 includes a component 6814 configured to operate the access point to send, e.g., transmit via a wireless transmitter, a command to at least one station, e.g. the first station, to advertise a supported number of spatial streams (e.g., the second maximum number of supported spatial streams) less than the actual maximum number of supported spatial streams (e.g., the first (e.g., initial) maximum number of supported spatial streams) for the station, e.g., for the first station.

Assembly of components 600 further includes a component 642 configured to determine if the determined average throughput for the STA is less than or equal to a first bit rate, e.g. 312 Mbps, and to control operation as a function of the determination, a component 643 configured to determine to advertise (DTA) 1 as the number of supported streams for the STA, e.g., determine to command the STA to advertise 1 as the number of supported streams for the station, e.g., in response to a determination that the determined average throughput for the station is less than or equal to the first bit rate. Assembly of components 600 further includes a component 644 configured to operate the AP to send a command to the STA commanding the STA to advertise 1 for its number of spatial streams, as part of a readvertisement.

Assembly of components 600 further includes a component 646 configured to determine if the determined average throughput for the STA is less than or equal to a second bit rate, e.g. 624 Mbps, and to control operation as a function of the determination, a component 648 configured to determine if the actual maximum spatial stream count for the STA is less than 2 and to control operation as a function of the determination, a component 649 configured to determine to advertise (DTA) 2 as the number of supported streams for the STA, e.g., determine to command the STA to advertise 2 as the number of supported streams for the station, e.g., in response to a determination that the determined average throughput for the station is less than or equal to the second bit rate and the actual determined maximum spatial stream count for the STA is not less than 2. Assembly of components 600 further includes a component 652 configured to operate the AP to send a command to the STA commanding the STA to advertise 2 for its number of spatial streams, as part of a readvertisement.

Assembly of components 600 further includes a component 654 configured to determine if the determined average throughput for the STA is less than or equal to a third bit rate, e.g. 936 Mbps, and to control operation as a function of the determination, a component 656 configured to determine if the actual maximum spatial stream count for the STA is less than 3 and to control operation as a function of the determination, a component 657 configured to determine to advertise (DTA) 3 as the number of supported streams for the STA, e.g., determine to command the STA to advertise 3 as the number of supported streams for the station, e.g., in response to a determination that the determined average throughput for the station is less than or equal to the third bit rate and the actual determined maximum spatial stream count for the STA is not less than 3. Assembly of components 600 further includes a component 658 configured to operate the AP to send a command to the STA commanding the STA to advertise 3 for its number of spatial streams, as part of a readvertisement.

Assembly of components 600 further includes a component 660 configured to determine if the determined average throughput for the STA is less than or equal to a fourth bit rate, e.g. 1248 Mbps, and to control operation as a function of the determination, a component 662 configured to determine if the actual maximum spatial stream count for the STA is less than 4 and to control operation as a function of the determination, a component 663 configured to determine to advertise (DTA) 4 as the number of supported streams for the STA, e.g., determine to command the STA to advertise 4 as the number of supported streams for the station, e.g., in response to a determination that the determined average throughput for the station is less than or equal to the fourth bit rate and the actual determined maximum spatial stream count for the STA is not less than 4. Assembly of components 600 further includes a component 664 configured to operate the AP to send a command to the STA commanding the STA to advertise 4 for its number of spatial streams, as part of a readvertisement.

Assembly of components 600 further includes a component 6491 configured to determine to advertise the actual maximum number (DTA AM) of supported spatial streams, e.g., determine to command the STA to advertise the actual maximum number of supported spatial streams for the STA and a component 650 configured to operate the AP to send a command to the STA commanding the STA to advertise its actual maximum number of supported spatial steams, as part of a readvertisement. In various embodiments, component 6491 is configured to perform the operations of steps 2491, 2571, and 2631 of flowchart 200 of FIG. 2.

Assembly of components 600 further includes a component 676 configured to operate the access point to receive the readvertisement from the STA. Component 676 includes a component 6761 configured to operate the access point to receive an advertised spatial stream value number which is less than the actual maximum number of spatial streams supported by the station and a component 6762 configured to operate the access point to receive an advertised spatial stream value number which is the actual maximum number of spatial streams supported by the station. Assembly of components 600 further includes a component 678 configured to store the received advertised spatial stream count number for the STA, a component 679 configured to determine if a third predetermined amount of time, e.g. 15 minutes, has elapsed since the last CCA and to control operation as a function of the determination.

Assembly of components 600 further includes a component 682 configured to allocate AP spatial streams to STAs based on the received advertisements for the STAs, each received advertisement form a STA communicating a number of spatial streams, said communicated number of spatial streams being an actual maximum number of spatial streams supported by the STA (e.g., a first maximum number of spatial streams) or a number less than the actual maximum number of spatial streams supported by the STA (e.g., a second maximum number of spatial streams). Component 682 includes a component 684 configured to allocate one or more spatial streams to a first STA, said number of allocated spatial streams to first STA being less than or equal to the number of spatial streams communicated in the received advertisement, e.g., the most recently received re-advertisement, from the first STA, and a component 686 configured to allocate one or more spatial streams to an Nth STA, said number of allocated spatial streams to Nth STA being less than or equal to the number of spatial streams communicated in the received advertisement, e.g., the most recently received re-advertisement, from the Nth STA.

Assembly of components 600 further includes a component 688 configured to operate the AP to communicate with a first STA using the one or more spatial streams allocated to the first STA and a component 692 configured to operate the AP to communicate with the Nth STA using the one or more spatial streams allocated to the Nth STA. Assembly of components 600 further includes a component 696 configured to operate the AP to determine if the AP should perform a reallocation of its spatial streams to STAs, e.g., based on newly received spatial stream advertisements and/or dropped STAs no longer requiring service from the AP, a component 698 configured to control operation as a function of the determination if the AP is to perform re-allocation of station streams and a component 6261 configured to operate the AP to send a signal, e.g. a broadcast signal, to one or more STAs being services by the AP to evaluate throughput metrics and to re-advertise a number of spatial streams.

Figure 7A:
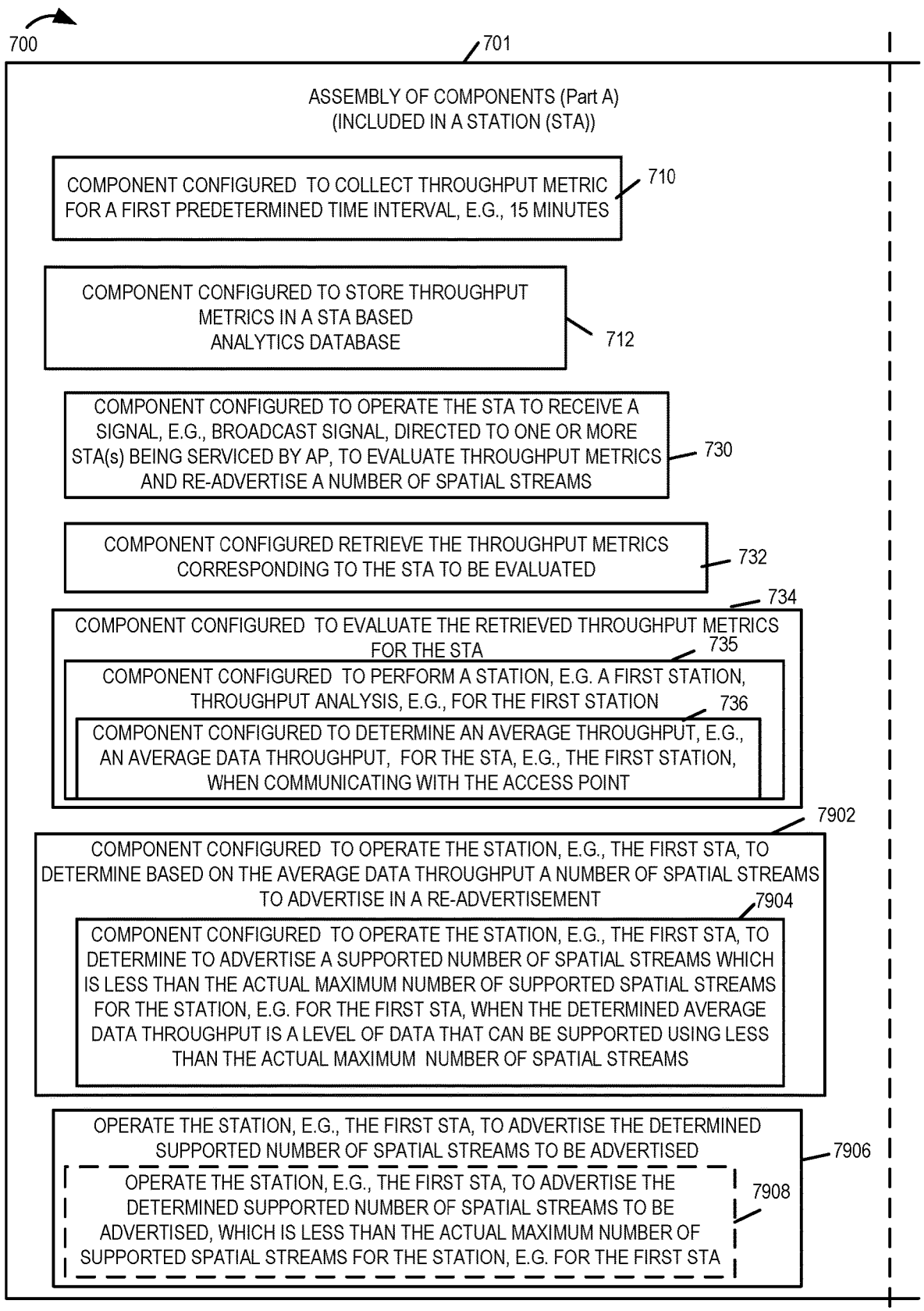
FIG. 7A is a drawing of a first part of an exemplary assembly of components which may be included in a station (STA) in accordance with an exemplary embodiment.
Figure 7B:
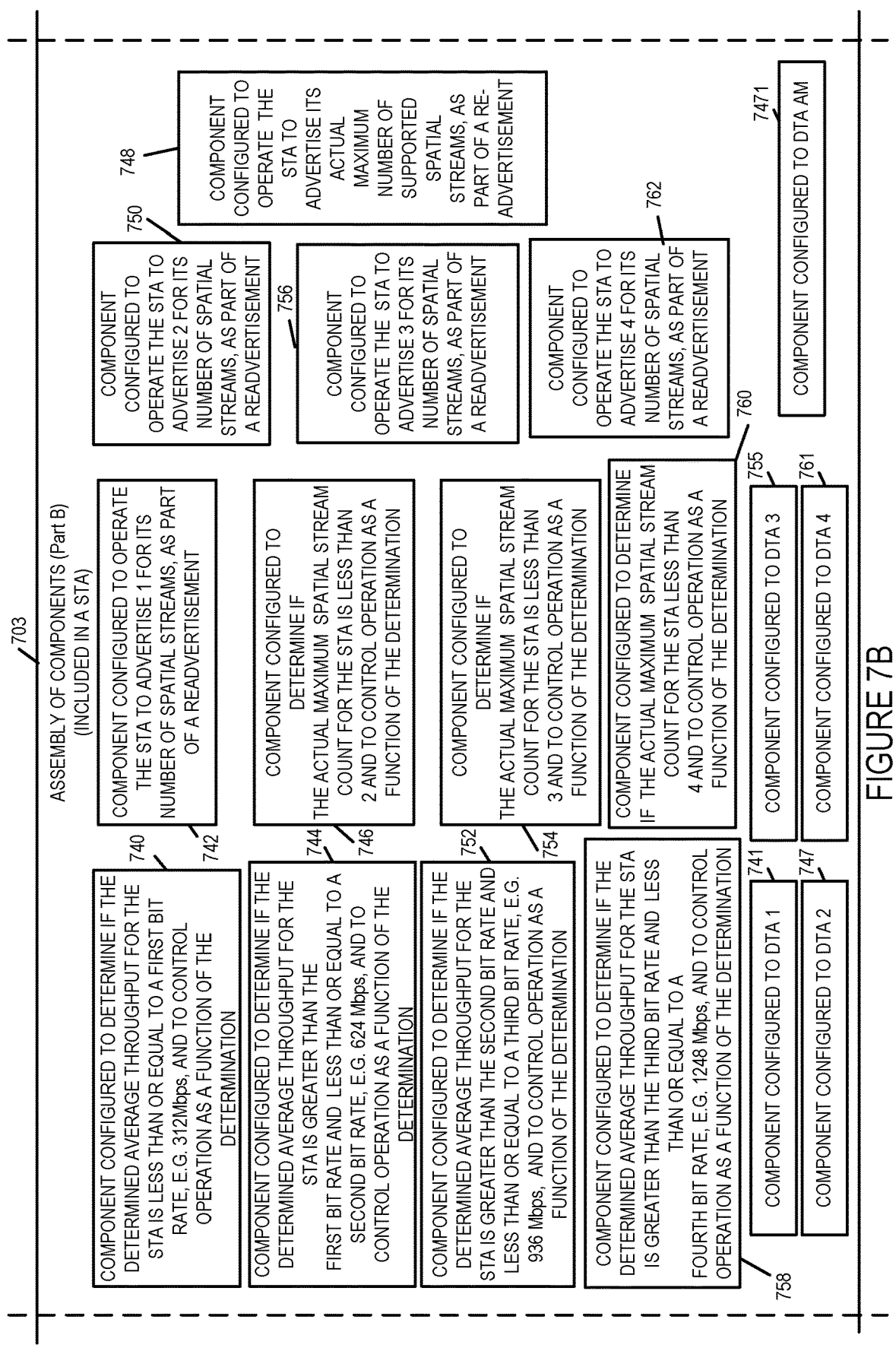
FIG. 7B is a drawing of a second part of an exemplary assembly of components which may be included in a station (STA) in accordance with an exemplary embodiment.
Figures 7, 7C:
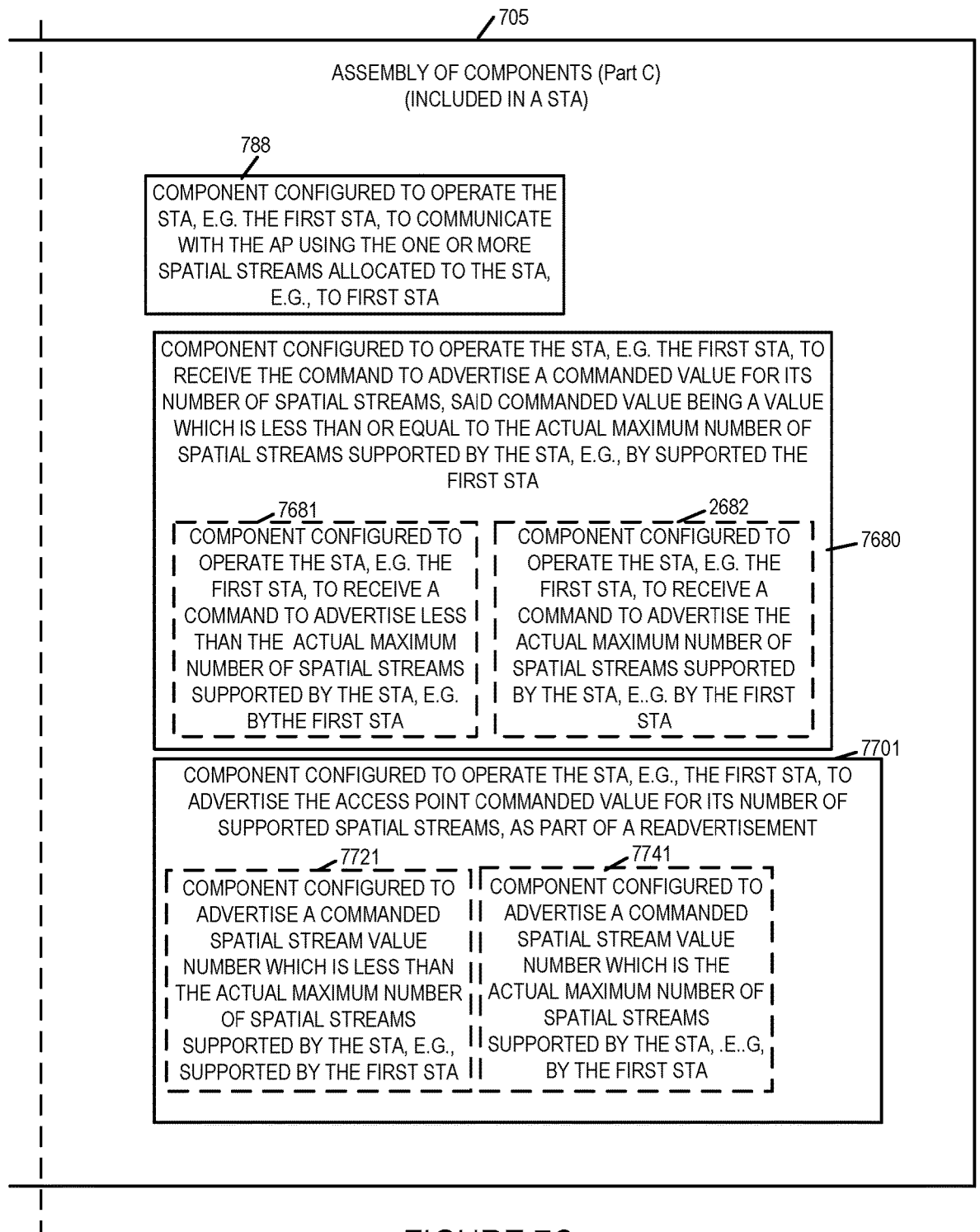
FIG. 7C is a drawing of a third part of an exemplary assembly of components which may be included in a station (STA) in accordance with an exemplary embodiment.
FIG. 7 comprises the combination of FIG. 7A, FIG. 7B and FIG. 7C.

FIG. 7 is a drawing of an exemplary assembly of components 700 which may be included in an exemplary station (STA) in accordance with an exemplary embodiment. FIG. 7, comprising the combination of FIG. 7A, FIG. 7B and FIG. 7C, is a drawing of an exemplary assembly of components 700, comprising Part A 701, Part B 703 and Part C 705, in accordance with an exemplary embodiment. Exemplary assembly of components 700, which may be included in a station (STA), e.g., STA 500 of FIG. 5, and implement steps of an exemplary method, e.g., steps of the method of the flowchart 200 of FIG. 2 and/or steps of the method of the flowchart 300 of FIG. 3.

Assembly of components 700 can be, and in some embodiments is, used in STA 500 of FIG. 5, or any of the STAs of FIG. 1, e.g. STA 2 106 of FIG. 1. The components in the assembly of components 700 can, and in some embodiments are, implemented fully in hardware within the processor 502, e.g., as individual circuits. The components in the assembly of components 700 can, and in some embodiments are, implemented fully in hardware within the assembly of components 518, e.g., as individual circuits corresponding to the different components. In other embodiments some of the components are implemented, e.g., as circuits, within the processor 502 with other components being implemented, e.g., as circuits within assembly of components 518, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 520 of the STA 500, with the components controlling operation of the STA to implement the functions corresponding to the components when the components are executed by a processor, e.g., processor 502. In some such embodiments, the assembly of components 700 is included in the memory 520 as assembly of components 554. In still other embodiments, various components in assembly of components 700 are implemented as a combination of hardware and software, e.g., with another circuit external to the processor 502 providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 700 is stored in the memory 520, the memory 520 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the STA 500, or elements therein such as the processor 502, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., steps of: the method of flowchart 200 of FIG. 2 and/or the method the method of flowchart 300 of FIG. 3 and/or described or shown with respect to any of the other figures.

Assembly of components 700 includes a component 710 configured to collect throughput metrics for a first predetermined time interval, e.g., 15 minutes, a component 712 configured to store throughput metrics in an STA based analytics database, a component 730 configured to operate the STA to receive a signal, e.g. a broadcast signal, directed to one or more STAs being service by the AP, to evaluate throughput metrics and re-advertise a number of spatial streams, a component 732 configured to retrieve the throughput metrics corresponding to the STA to be evaluated, and a component 734 configured to evaluate the retrieved throughput metrics for the STA. Component 734 includes a component 735 configured to perform a station, e.g. first station, throughput analysis for the station, e.g. for the first station, and a component 736 configured to determine an average throughput, e.g., an average data throughput, for the STA, e.g., an average data throughput for the first STA, when communicating with the access point.

Assembly of components 700 further includes a component 7902 configured to operation the station, e.g. the first STA, to determine, based on the average data throughput, a number of spatial streams to advertise in a re-advertisement. Component 7902 includes a component 7904 configured to operate the station, e.g., the first STA, to determine to advertise a supported number of spatial streams which is less than the actual maximum number of supported spatial streams for the station, e.g. for the first STA, when the determined average data throughput is a level of data that can be supported using less than the actual maximum number of spatial streams. Assembly of components 700 further includes a component 7906 configured to operate the station, e.g. the first STA, to advertise the determined supported number of spatial streams to be advertised. Component 7906 includes a component 7908 configured to operate the station, e.g., the first station, to advertise the determined supported number of spatial streams to be advertised, which is less than the actual maximum number of supported spatial streams for the station, e.g. for the first station.

Assembly of components 700 further includes a component 740 configured to determine if the determined average throughput for the station is less than or equal to a first bit rate, e.g., 312 Mbps, and to control the operation as a function of the determination, a component 742 configured to operate the station to advertise 1 for its number of spatial streams, as part of a re-advertisement, e.g. in response to a determination that the determined average throughput for the station is less than or equal to the first bit rate.

Assembly of components 700 further includes a component 744 configured to determine if the determined average throughput for the station is greater than the first bit rate and less than or equal to a second bit rate, e.g., 624 Mbps, and to control the operation as a function of the determination, a component 746 configured to determine if the actual maximum spatial stream count for the station is less and 2 and to control operation as function of the determination, and a component 750 configured to operate the station to advertise 2 for its number of spatial streams, as part of a re-advertisement, e.g. in response to a determination that the determined actual maximum spatial stream count for the station is not less than 2 and a determination that the determined average throughput for the station is greater than the first bit rate and less than or equal to the second bit rate.

Assembly of components 700 further includes a component 752 configured to determine if the determined average throughput for the station is greater than the second bit rate and less than or equal to a third bit rate, e.g., 936 Mbps, and to control the operation as a function of the determination, a component 754 configured to determine if the actual maximum spatial stream count for the station is less and 3 and to control operation as function of the determination, and a component 756 configured to operate the station to advertise 3 for its number of spatial streams, as part of a re-advertisement, e.g. in response to a determination that the determined actual maximum spatial stream count for the station is not less than 3 and a determination that the determined average throughput for the station is greater than the second bit rate and less than or equal to the third bit rate.

Assembly of components 700 further includes a component 758 configured to determine if the determined average throughput for the station is greater than the third bit rate and less than or equal to a fourth bit rate, e.g., 1248 Mbps, and to control the operation as a function of the determination, a component 760 configured to determine if the actual maximum spatial stream count for the station is less and 4 and to control operation as function of the determination, and a component 762 configured to operate the station to advertise 4 for its number of spatial streams, as part of a re-advertisement, e.g. in response to a determination that the determined actual maximum spatial stream count for the station is not less than 4 and a determination that the determined average throughput for the station is greater than the third bit rate and less than or equal to the fourth bit rate.

Assembly of components 700 further includes a component 748 configured to operate the station to advertises its actual maximum number of supported streams, as part of a re-advertisement, e.g., in response to any of: i) a determination that the determine average throughput for the STA is greater than the first bit rate and less the second bit rate and a determination that the determined actual maximum spatial stream count (e.g., 1) for the station is less than 2, ii) a determination that the determined average throughput for the STA is greater than the second bit rate and less and the third bit rate and a determination that the determined actual maximum spatial stream count (e.g., 2) for the station is less than 3, and iii) a determination that the determined average throughput for the STA is greater than the third bit rate and less and the fourth bit rate and a determination that the determined actual maximum spatial stream count (e.g., 3) for the station is less than 4.

Assembly of components 700 further includes a component 741 configured to determine to advertise 1 (DTA 1) as its number of supported spatial steams, e.g. in response to a determination that the determined average throughput for the station is less than or equal to the first bit rate; a component 747 configured to determine to advertise 2 (DTA 2) as its number of supported spatial steams, e.g. in response to a determination that the determined average throughput for the station is greater than the first bit rate and less than or equal to the second bit rate and a determination that the actual maximum spatial stream count for the station is not less than 2; a component 755 configured to determine to advertise 3 (DTA 3) as its number of supported spatial steams, e.g. in response to a determination that the determined average throughput for the station is greater than the second bit rate and less than or equal to the third bit rate and a determination that the actual maximum spatial stream count for the station is not less than 3; and a component 761 configured to determine to advertise 4 (DTA 4) as its number of supported spatial steams, e.g. in response to a determination that the determined average throughput for the station is greater than the third bit rate and less than or equal to the fourth bit rate and a determination that the actual maximum spatial stream count for the station is not less than 4.

Assembly of components 700 further includes a component 7471 configured to operate the station to determine to advertise (DTA) its actual maximum (AM) number of supported streams, as part of a re-advertisement, e.g., in response to any of: i) a determination that the determined average throughput for the STA is greater than the first bit rate and less and the second bit rate and a determination that the determined actual maximum spatial stream count (e.g., 1) for the station is less than 2, ii) a determination that the determined average throughput for the STA is greater than the second bit rate and less and the third bit rate and a determination that the determined actual maximum spatial stream count (e.g., 2) for the station is less than 3, and iii) a determination that the determined average throughput for the STA is greater than the third bit rate and less and the fourth bit rate and a determination that the determined actual maximum spatial stream count (e.g., 3) for the station is less than 4. In various embodiments, component 7471 performs the operations of steps 4471, 3511 and 3611 of FIG. 3.

Assembly of components 700 further includes a component 788 configured to operate the station, e.g., the first station, to communicate with the access point using the one or more spatial streams allocated to the station, e.g., to the first station, a component 7680 configured to operate the station, e.g., the first station, to receive a command to advertise a commanded value for its number of spatial streams, said commanded value being a value which is less than or equal to the actual maximum number of spatial streams supported by the station, e.g. supported by the first station. Component 7680 includes a component 7681 configure to advertise a commanded spatial stream value which is less than the actual maximum number of spatial streams supported by the station, e.g., the first station and a component 7682 configured to advertise a commanded spatial steam value number which is the actual maximum number of spatial streams supports by the station, e.g. actual maximum number of spatial streams supported by the first station.

Assembly of components 700 further includes a component 7701 configured to operate the station, e.g., the first station, to advertise the access point commanded value for its number of supported spatial streams, as part of a re-advertisement. Component 7701 includes a component 7721 configured to advertise a commanded spatial stream value number (e.g., a second maximum) which is less than the actual maximum (e.g., first maximum) number of station streams supported by the station, e.g., the first station, and a component 7741 configured to advertise a commanded spatial stream value number which is the actual maximum (e.g., first maximum) number of station streams supported by the station, e.g., the first station.

FIG. 8 is drawing 800 of a third part of a flowchart of an exemplary method of operating a communications system, which is alternative to FIG. 2C, in accordance with an exemplary embodiment. Operation proceeds from step 236 of FIG. 2B, via connecting node B 240, to step 802 in which the access point performs station (STA) throughput analysis for each identified station. Step 802 includes step 804 in which the access point performs station (STA) throughput analysis for a first station (first STA). Operation proceeds from step 802 to step 806.

In step 806 the access point determines to advertise a number of spatial streams for each of the identified stations. Step 806 includes step 808 in which the access point determines to advertise a supported number of spatial streams, (e.g., a second maximum number of spatial streams), less than the actual maximum number of supported spatial streams (e.g., a first maximum number of spatial streams) for the first STA. Operation proceeds from step 806 to step 810.

In step 810 the access point instructs each of the identified station to report a determined number of spatial streams. Step 810 includes step 812, in which the access point instructs at least one station, e.g. the first station, to advertise a supported number of spatial streams (second maximum) which is less than the actual maximum (first maximum) number of supported spatial streams. Step 812 includes step 814 in which the access point sends a command to at least one station, e.g., the first station, to advertise a supported number of spatial streams less than the actual maximum number of supported spatial streams for the station, e.g. for the first station. Operation proceeds from step 810, via connecting node C 266 to step 282.

FIG. 9 is drawing 900 of a third part of a flowchart of an exemplary method of operating a communications system, which is alternative to FIG. 3C, in accordance with an exemplary embodiment. Operation proceeds from step 334 of FIG. 3B, via connecting node B 338, to step 902. In step 902 the station, e.g., the first station, determines based on the average data throughput a number of spatial streams to advertise in a re-advertisement. Step 902 includes step 904 in which the station, e.g., the first station, determines to advertise a supported number of spatial streams (e.g., second maximum number of spatial streams) which is less than the actual maximum number of supported spatial streams (e.g., first maximum number of supported streams) for the station, e.g., for the first station, when the determined average throughput is a level of data that can be supported using less than the actual maximum number of supported spatial streams (first maximum number of supported streams). Operation proceeds from step 902 to step 906.

In step 906 the station, e.g. the first station (first STA), advertises the determined supported number of spatial streams to be advertised. Step 906 includes step 908, which is performed in some iterations of step 906. In step 908 the station, e.g. the first station, advertises the determined supported number of spatial streams to be advertised, which is less than the actual maximum number of supported spatial streams for the station, e.g., for the first station. Operation proceeds from step 906, via connecting node C 914 to step 368 of FIG. 3D.

Various aspects, features and/or advantages of some embodiments of the present invention are further discussed below. In some embodiments, implemented in accordance with features of the present invention, STAs in need of throughput that is below a certain threshold are able to advertise the device as a reduced spatial stream (SS) to into the capacity of the MU-MIMO grouping. In some such embodiments, if the STA is in need of more throughput than currently advertised, then the STA would re-advertise the device accordingly for increased throughput and the AP would re-group accordingly.

By proactively reducing the number of spatial streams a STA advertises, the AP has an easier time correcting improper stream selection. In some embodiments the approach of the proactive reduction of the number of spatial streams a STA advertises is implemented as an AP based solution, e.g., as in the method of flowchart 200 of FIG. 2. In some other embodiments the approach of the proactive reduction of the number of spatial streams a STA advertises is implemented as STA based solution, e.g., as in the method of flowchart 300 of FIG. 3.

In some embodiments, the re-advertisement of spatial stream (SS) count is only available on STAs configured to implement this novel approach, e.g., service provider STAs. Exemplary service provider STAs, which may, and sometimes do, implement this novel approach include, e.g., set top boxes (STBs), and/or extenders. In some other embodiments, the re-advertisement of spatial stream (SS) count is available on any STAs configured to implement this novel approach, e.g., multi-SS STBs, multi-SS extenders, multi-SS laptops, and/or any other multi-SS wireless devices.

Various benefits from the novel methods and apparatus in accordance with the present invention will now be described. With the reduction of advertised MIMO capability, the wireless application protocol (WAP) will have reduced complexity when grouping STAs from MU-MIMO transmissions, as compared to current implementation. At least some poor solutions which select the wrong answer, e.g., a non-optimal solution, with regard to allocation of AP spatial streams among a plurality of STAs, will be removed; thus implementations including novel features of the present invention provide optimal or near optimal solutions in comparison to the current approaches. Proactively reducing the STAs MIMO capability removes poor MU-MIMO algorithms and/or imprecise channel sounding results which result in the STA(s) having poor connecting and throughput; thus implementations including novel features of the present invention can, and sometimes do, have improved connectivity and/or improved throughput over current approaches. Measuring the throughput characteristics over time of the STA, allows the ecosystem to intelligently increase/decrease MIMO capability advertisements to better suit the STAs needs.

In various exemplary embodiments, the exemplary method identifies if there is action to be taken and monitors the STAs throughput metrics to base the decision. In some such embodiments, the exemplary method includes modifying the spatial stream advertisements based on the throughput metrics. In some embodiment the identification is AP based, and the decision is AP based. In other embodiments the identification is STA based and the decision is STA based.

In some embodiments, a STA is allowed to advertise its stream capability given its achieved throughput and system capacity. Thus a STA may, and sometimes does, advertise a lower spatial stream count than its maximum spatial stream count. Some embodiments allow an advertised stream count to be modified based on the over the air throughput during conditions of AP wireless capacity, e.g., router limited WiFi capacity. Some embodiments including novel features of the present invention, allow a local AP, e.g., local router, to optimize the system capacity overriding a flawing or non-optimal MU-MIMO scheme which would otherwise be used.

Various implementations in accordance with the present invention improve AP capacity, e.g., router system (local) WiFi capacity, especially for high antenna count clients like Set Top Box (STB). Various implementations in accordance with the present invention, can reduce or remove expensive truck rolls over current approaches, by locally controlling complex MU-MIMO errors which can be introduced with new driver codes.

NUMBERED LIST OF EXEMPLARY METHOD EMBODIMENTS

Method Embodiment 1

A communications method, the method comprising: receiving (206 or 306), at an access point (AP), a first (e.g., initial) advertisement from a first station indicating a first maximum number of spatial streams supported by the first station; receiving (276 including 2761 or 368 including 370), at the access point, a re-advertisement from the first station, said re-advertisement indicating a second maximum number of spatial streams supported by the first station, said second maximum number of spatial streams being lower than said first maximum number of spatial streams; and operating (282 or 380) the access point to allocate AP spatial streams to stations based on advertisements of the maximum number of spatial streams supported by the individual stations transmitting advertisements to the access point.

Method Embodiment 2

The communications method of Method Embodiment 1, wherein the second maximum number of spatial streams is less than actual maximum number of spatial streams supported by the first station at the time of said re-advertisement indicating the second maximum number, said actual maximum number of spatial streams being said first maximum number of spatial streams.

Method Embodiment 3

The communications method of Method Embodiment 2, wherein operating (282 or 380) the access point to allocate AP spatial streams to stations based on advertisements of the maximum number of spatial streams supported by the individual stations includes allocating (284 or 382): i) the second maximum number of spatial streams or ii) a number of spatial streams less than the second maximum number of spatial streams to the first station.

Method Embodiment 4

The communications method of Method Embodiment 3, further comprising: operating (288 or 386) the access point to communicate with the first station using the allocated number of spatial streams, said allocated number of spatial streams being less than the actual maximum number of spatial streams supported by the first station.

Method Embodiment 5

The communications method of Method Embodiment 4, further comprising: operating (216) the access point to perform a clear channel assessment including determining (218) a clear channel assessment (CCA) channel utilization percentage; comparing (224) the determined CCA channel utilization percentage to a channel utilization threshold (e.g., 75%); and in response to determining that the CCA channel utilization percentage is greater than said channel utilization threshold, determining (227) if an action should be taken to reduce the maximum supported number of spatial streams one or more stations should advertise.

Method Embodiment 6

The method of Method Embodiment 5, further comprising: in response to determining that an action should be taken to reduce the maximum supported number of spatial streams one or more stations should advertise, operating (802) the access point to perform per station data throughput analysis; and operating (812) the access point to instruct (e.g., transmit a re-advertisement including a access point specified number of spatial streams as a maximum number of supported streams) one or more stations to advertise in a re-advertisement a lower maximum number of supported spatial streams than the number that was originally advertised.

Method Embodiment 7

The method of Method Embodiment 6, wherein said step of operating (812) the access point to instruct one or more stations includes operating (814) the access point to send a command to the first station to advertise said second maximum number of spatial streams where said second maximum number of spatial streams is lower than said first maximum number of spatial streams.

Method Embodiment 8

The method of Method Embodiment 7, wherein said access point receives said re-advertisement from the first station after transmission of said command to the first station, said re-advertisement begin a response to said command commanding the first station to advertise said second number.

Method Embodiment 9

The method of Method Embodiment 3, further comprising: operating (330) the first station to receive (330) a signal from the access point directing the first station to evaluate throughput metrics and re-advertise a maximum number of supported streams.

Method Embodiment 10

The method of Method Embodiment 9, further comprising: operating (336) the first station to determine the average data throughput for the first station when communicating with the access point; and operating (902) the first station to determine based on the average data throughput a maximum number of spatial streams to advertise in a re-advertisement.

Method Embodiment 11

The method of Method Embodiment 10, wherein the maximum number of spatial streams to advertise in the re-advertisement is a number lower than the first maximum number of supported streams when the determined average data throughput is a level of data throughput that can be supported using less than the first maximum number of spatial streams.

NUMBERED LIST OF EXEMPLARY SYSTEM EMBODIMENTS

System Embodiment 1

A communications system (100), the system comprising: an access point (102 or 400) supporting multiple spatial streams, the access point including: a wireless receiver (412); and a first processor (402), said first processor configured to operate the access point to: receive (206 or 306) (via said wireless receiver) a first (e.g., initial) advertisement from a first station indicating a first maximum number of spatial streams supported by the first station; receive (276 including 2761 or 368 including 370) (via the wireless receiver) a re-advertisement from the first station, said re-advertisement indicating a second maximum number of spatial streams supported by the first station, said second maximum number of spatial streams being lower than said first maximum number of spatial streams; and allocate (282 or 380) AP spatial streams to stations based on advertisements of the maximum number of spatial streams supported by the individual stations transmitting advertisements to the access point.

System Embodiment 2

The communications system of System Embodiment 1, wherein the second maximum number of spatial streams is less than actual maximum number of spatial streams supported by the first station at the time of said re-advertisement indicating the second maximum number, said actual maximum number of spatial streams being said first maximum number of spatial streams.

System Embodiment 3

The communications system of System Embodiment 2, wherein said first processor is configured to allocate (284 or 382): i) the second maximum number of spatial streams or ii) a number of spatial streams less than the second maximum number of spatial streams to the first station, as part of being configured to allocate (282 or 380) AP spatial streams to stations based on advertisements of the maximum number of spatial streams supported by the individual stations.

System Embodiment 4

The communications system of System Embodiment 3, wherein said first processor is further configured to: operate (288 or 386) the access point to communicate with the first station using the allocated number of spatial streams, said allocated number of spatial streams being less than the actual maximum number of spatial streams supported by the first station.

System Embodiment 5

The communications method of System Embodiment 4, wherein said first processor is further configured to: operate (216) the access point to perform a clear channel assessment including determining (218) a clear channel assessment (CCA) channel utilization percentage; compare (224) the determined CCA channel utilization percentage to a channel utilization threshold (e.g., 75%); and in response to determining that the CCA channel utilization percentage is greater than said channel utilization threshold, determine (227) if an action should be taken to reduce the maximum supported number of spatial streams one or more stations should advertise.

System Embodiment 6

The communications system of System Embodiment 5, wherein said first processor is further configured to: operate (802) the first access point to perform per station data throughput analysis in response to determining that an action should be taken to reduce the maximum supported number of spatial streams one or more stations should advertise; and operate (812) the access point to instruct (e.g., transmit a re-advertisement including a access point specified number of spatial streams as a maximum number of supported streams) one or more stations to advertise in a re-advertisement a lower maximum number of supported spatial streams than the number that was originally advertised.

System Embodiment 7

The communications system of System Embodiment 6, wherein said first processor is further configured to: operate (814) the access point to send a command to the first station to advertise said second maximum number of spatial streams where said second maximum number of spatial streams is lower than said first maximum number of spatial streams, as part of being configured to operate (812) the access point to instruct one or more stations.

System Embodiment 8

The communications system of System Embodiment 7, wherein said access point receives said re-advertisement from the first station after transmission of said command to the first station, said re-advertisement begin a response to said command commanding the first station to advertise said second number System Embodiment 9

The communications system of System Embodiment 3, further comprising: a first station (106 or 500) supporting multiple spatial streams, said first station including: a wireless receiver (538); and a second processor (502) configured to: operate (330) the first station to receive (330) a signal from the access point directing the first station to evaluate throughput metrics and re-advertise a maximum number of supported streams.

System Embodiment 10

The communications system of System Embodiment 9, wherein said second processor is further configured to:

determine (336) the average data throughput for the first station when communicating with the access point; and determine (902) based on the average data throughput a maximum number of spatial streams to advertise in a re-advertisement.

System Embodiment 11

The communications system of System Embodiment 10, wherein the maximum number of spatial streams to advertise in the re-advertisement is a number lower than the first maximum number of supported streams when the determined average data throughput is a level of data throughput that can be supported using less than the first maximum number of spatial streams.

NUMBERED LIST OF EXEMPLARY NON-TRANSITORY COMPUTER READABLE MEDIUM EMBODIMENTS

Non-Transitory Computer Readable Medium Embodiment 1

A non-transitory computer readable medium (410) including computer executable instructions which when executed by a processor (402) control an access point (400) supporting multiple spatial streams to perform the steps of: receiving, at an access point (AP), a first advertisement from a first station indicating a first maximum number of spatial streams supported by the first station; receiving, at the access point, a re-advertisement from the first station, said re-advertisement indicating a second maximum number of spatial streams supported by the first station, said second maximum number of spatial streams being lower than said first maximum number of spatial streams; and allocating AP spatial streams to stations based on advertisements of the maximum number of spatial streams supported by the individual stations transmitting advertisements to the access point.

Non-Transitory Computer Readable Medium Embodiment 2

A non-transitory computer readable medium (520) including computer executable instructions which when executed by a processor (502) control a first station (500) to perform the steps of: operating the first station to receive a signal from an access point directing the first station to evaluate throughput metrics and re-advertise a maximum number of supported streams.

Non-Transitory Computer Readable Medium Embodiment 3

The non-transitory computer readable medium (520) of Non-Transitory Computer Readable Medium Embodiment 2, further including computer executable instructions which when executed by the processor (502) control the first station (500) to perform the steps of: operating the first station to determine the average data throughput for the first station when communicating with the access point; and operating the first station to determine based on the average data throughput a maximum number of spatial streams to advertise in a re-advertisement.

The techniques of various embodiments may be implemented using software, hardware and/or a combination of software and hardware. Various embodiments are directed to apparatus, e.g., stations (STAs), e.g. set top boxes supporting multiple spatial streams, wireless extenders supporting multiple spatial streams, laptop PCs supporting multiple spatial streams, other wireless devices supporting multiple spatial streams, cell phones, user devices such as a user equipment (UE) device, base stations such as a gNB or ng-eNB, access points supporting multiple spatial streams, e.g. WiFi routers supporting multiple spatial streams, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating access points, stations, user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message generation, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., an access point, a station, a base station, including a processor configured to implement one, multiple or all of the steps of one or more methods of the invention.

In some embodiments, the processor or processors, e.g., CPUs, of one or more devices, e.g., access points, stations, communications nodes such as base stations or UEs are configured to perform the steps of the methods described as being performed by the communications nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as an access point, a station, a base station or UE including, with a processor which includes a component corresponding to each of the steps of the various described methods performed by the device in which the processor is included. In some but not all embodiments a device, e.g., communications node, such as an access point, a station, a base station or UE, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating an access point or a station or a base station or UE. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as an access point or a station or a base station, a UE, a controller, or other device described in the present application. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
receiving, at an access point (AP), a first advertisement from a first station indicating a first maximum number of spatial streams supported by the first station;
receiving, at the access point, a re-advertisement from the first station, said re-advertisement indicating a second maximum number of spatial streams supported by the first station, said second maximum number of spatial streams being lower than said first maximum number of spatial streams;
operating the access point to allocate AP spatial streams to a plurality of stations based on advertisements of the maximum number of spatial streams supported by individual stations, said first station being one of said plurality of stations;
operating the access point to perform a clear channel assessment (CCA) including determining a CCA channel utilization;
comparing the determined CCA channel utilization to a channel utilization threshold; and
in response to determining that the CCA channel utilization is greater than said channel utilization threshold, determining if an action should be taken to reduce the maximum supported number of spatial streams one or more stations should advertise, said one more stations being stations in said plurality of stations.

2. The communications method of claim 1,
wherein the second maximum number of spatial streams is less than actual maximum number of spatial streams supported by the first station at the time of said re-advertisement indicating the second maximum number, said actual maximum number of spatial streams supported by the first station at the time of said re-advertisement being said first maximum number of spatial streams.

3. The communications method of claim 2, wherein operating the access point to allocate AP spatial streams to stations based on advertisements of the maximum number of spatial streams supported by the individual stations includes allocating: i) the second maximum number of spatial streams or ii) a number of spatial streams less than the second maximum number of spatial streams to the first station.

4. The communications method of claim 3, further comprising:
operating the access point to communicate with the first station using the allocated number of spatial streams, said allocated number of spatial streams being less than the actual maximum number of spatial streams supported by the first station.

5. The communications method of claim 4, wherein channel utilization is expressed as a percentage.

6. The method of claim 1, further comprising:
in response to determining that an action should be taken to reduce the maximum supported number of spatial streams one or more stations should advertise, operating the access point to perform per station data throughput analysis; and
operating the access point to instruct one or more stations to advertise in a re-advertisement a lower maximum number of supported spatial streams than the number that was originally advertised, said one more stations being stations in said plurality of stations.

7. The method of claim 6, wherein said step of operating the access point to instruct one or more stations includes operating the access point to send a command to the first station to advertise said second maximum number of spatial streams where said second maximum number of spatial streams is lower than said first maximum number of spatial streams, said one more stations being stations in said plurality of stations.

8. The method of claim 7, wherein said access point receives said re-advertisement from the first station after transmission of said command to the first station, said re-advertisement being a response to said command commanding the first station to advertise said second maximum number.

9. The method of claim 3, further comprising:
operating the first station to receive a signal from the access point directing the first station to evaluate throughput metrics and re-advertise a maximum number of supported streams.

10. The method of claim 9, further comprising:
operating the first station to determine the average data throughput for the first station when communicating with the access point; and
operating the first station to determine based on the average data throughput a maximum number of spatial streams to advertise in a re-advertisement.

11. The method of claim 10, wherein the maximum number of spatial streams to advertise in the re-advertisement is a number lower than the first maximum number of supported streams when the determined average data throughput is a level of data throughput that can be supported using less than the first maximum number of spatial streams.

12. A communications system, the system comprising:
an access point supporting multiple spatial streams, the access point including:
a wireless receiver; and
a first processor, said first processor configured to operate the access point to:
receive a first advertisement from a first station indicating a first maximum number of spatial streams supported by the first station;
receive a re-advertisement from the first station, said re-advertisement indicating a second maximum number of spatial streams supported by the first station, said second maximum number of spatial streams being lower than said first maximum number of spatial streams;
allocate AP spatial streams to a plurality of stations based on advertisements of the maximum number of spatial streams supported by individual stations, said first station being one of said plurality of stations;
perform a clear channel assessment (CCA) including determining a CCA channel utilization;
compare the determined CCA channel utilization to a channel utilization threshold; and
in response to determining that the CCA channel utilization is greater than said channel utilization threshold, determine if an action should be taken to reduce the maximum supported number of spatial streams one or more stations should advertise, said one more stations being stations in said plurality of stations.

13. The communications system of claim 12, wherein the second maximum number of spatial streams is less than actual maximum number of spatial streams supported by the first station at the time of said re-advertisement indicating the second maximum number, said actual maximum number of spatial streams being said first maximum number of spatial streams.

14. The communications system of claim 13, wherein said first processor is configured to allocate: i) the second maximum number of spatial streams or ii) a number of spatial streams less than the second maximum number of spatial streams to the first station, as part of being configured to allocate AP spatial streams to stations based on advertisements of the maximum number of spatial streams supported by the individual stations.

15. The communications system of claim 14, wherein said first processor is further configured to:
operate the access point to communicate with the first station using the allocated number of spatial streams, said allocated number of spatial streams being less than the actual maximum number of spatial streams supported by the first station.

16. The communications method of claim 15, wherein clear channel assessment (CCA) channel utilization is expressed as a percentage.

17. The communications system of claim 12, wherein said first processor is further configured to:
operate the access point to perform per station data throughput analysis in response to determining that an action should be taken to reduce the maximum supported number of spatial streams one or more stations should advertise; and
operate the access point to instruct one or more stations to advertise in a re-advertisement a lower maximum number of supported spatial streams than the number that was originally advertised, said one more stations being stations in said plurality of stations.

18. The communications system of claim 17, wherein said first processor is further configured to:
operate the access point to send a command to the first station to advertise said second maximum number of spatial streams where said second maximum number of spatial streams is lower than said first maximum number of spatial streams, as part of being configured to operate the access point to instruct one or more stations, said one more stations being stations in said plurality of stations.

19. The communications system of claim 14, further comprising:
said first station supporting multiple spatial streams, said first station including:
a wireless receiver; and
a second processor configured to:
operate the first station to: i) receive a signal from the access point directing the first station to evaluate throughput metrics and ii) re-advertise a maximum number of supported streams.

20. A non-transitory computer readable medium including computer executable instructions which when executed by a processor control an access point supporting multiple spatial streams to perform the steps of:
receiving, at the access point (AP), a first advertisement from a first station indicating a first maximum number of spatial streams supported by the first station;
receiving, at the access point, a re-advertisement from the first station, said re-advertisement indicating a second maximum number of spatial streams supported by the first station, said second maximum number of spatial streams being lower than said first maximum number of spatial streams;

allocating AP spatial streams to a plurality of stations based on advertisements of the maximum number of spatial streams supported by individual stations, said first station being one of said plurality of stations;
performing a clear channel assessment (CCA) including determining a CCA channel utilization;
comparing the determined CCA channel utilization to a channel utilization threshold; and
in response to determining that the CCA channel utilization is greater than said channel utilization threshold, determining if an action should be taken to reduce the maximum supported number of spatial streams one or more stations should advertise, said one more stations being stations in said plurality of stations.

* * * * *